US010239136B2

(12) United States Patent
Guth

(10) Patent No.: US 10,239,136 B2
(45) Date of Patent: Mar. 26, 2019

(54) CIRCULAR SAW APPARATUS WITH INTEGRATED MULTISTAGE FILTRATION SYSTEM

(71) Applicant: JPL GLOBAL, LLC, Moreno Valley, CA (US)

(72) Inventor: Paul W. Guth, Menifee, CA (US)

(73) Assignee: JPL GLOBAL, LLC, Moreno Valley, CA (US)

( * ) Notice: Subject to any disclaimer, the term of this patent is extended or adjusted under 35 U.S.C. 154(b) by 16 days.

(21) Appl. No.: 15/253,865

(22) Filed: Aug. 31, 2016

(65) Prior Publication Data

US 2017/0056988 A1 Mar. 2, 2017

Related U.S. Application Data

(60) Provisional application No. 62/212,373, filed on Aug. 31, 2015.

(51) Int. Cl.
*B23D 59/00* (2006.01)
*B23D 59/02* (2006.01)
(Continued)

(52) U.S. Cl.
CPC ......... *B23D 59/006* (2013.01); *B23D 47/025* (2013.01); *B23D 47/045* (2013.01);
(Continued)

(58) Field of Classification Search
CPC ...... B23D 59/006; B23D 59/02; B23D 59/00; B23D 47/045; B23D 47/025;
(Continued)

(56) References Cited

U.S. PATENT DOCUMENTS 4,674,381 A * 6/1987 Cadorin ................. B23D 51/14
83/578
6,470,778 B1 * 10/2002 Kaye, Jr. .............. B23D 59/006
144/252.1
(Continued)

FOREIGN PATENT DOCUMENTS

RU 2046712 10/1995
RU 2009142370 A 5/2011
(Continued)

OTHER PUBLICATIONS

JPL Global LLC, PCT/US2016/049798. Int'l Search Report & Written Opinion (dated Dec. 8, 2016).

*Primary Examiner* — Timothy V Eley
(74) *Attorney, Agent, or Firm* — Loza & Loza, LLP; Daniel S. Castro

(57) ABSTRACT

Various dust collection apparatuses are disclosed, which include a vacuum source, a circular saw blade, and a worktable comprising a center slot axially aligned to the circular saw blade. In a first aspect, the center slot includes an air flow channel proximate to an anticipated point of contact between the circular saw blade and a workpiece, and the vacuum source is configured to provide a focused negative pressure beneath the worktable via the air flow channel. In another aspect, the vacuum source provides a negative pressure beneath the worktable at the center slot, and a multistage filter is included to collect airborne dust drawn by the negative pressure from an area proximate to the center slot. In yet another aspect, the vacuum source is configured to provide a first negative pressure beneath the worktable at the center slot, and a second negative pressure via an auxiliary port.

4 Claims, 30 Drawing Sheets

(51) Int. Cl.
  *B23D 47/04* (2006.01)
  *B23D 47/02* (2006.01)
  *B23Q 11/00* (2006.01)
  *B28D 1/04* (2006.01)

(52) U.S. Cl.
  CPC ............. *B23D 59/00* (2013.01); *B23D 59/02* (2013.01); *B23Q 11/0046* (2013.01); *B28D 1/042* (2013.01)

(58) Field of Classification Search
  CPC ...... B23Q 11/0046; B28D 1/04; B28D 1/042; B27B 5/185; B27B 5/201; Y10T 83/207; Y10T 83/7722
  See application file for complete search history.

(56) References Cited

U.S. PATENT DOCUMENTS

| | | | | |
|---|---|---|---|---|
| 8,561,512 B2* | 10/2013 | Loveless | ............... | B23D 59/006 83/100 |
| 8,869,786 B2* | 10/2014 | Faiweather | ........ | B23Q 11/0046 125/13.01 |
| 9,682,496 B2* | 6/2017 | Fairweather | ....... | B23Q 11/0046 |
| 2005/0205075 A1* | 9/2005 | Guth | .................. | B23Q 11/0046 125/13.01 |
| 2007/0074613 A1* | 4/2007 | Yu | ......................... | B23D 45/068 83/581 |
| 2009/0277315 A1* | 11/2009 | Ipatenco | ................ | B28D 1/047 83/171 |
| 2010/0116261 A1* | 5/2010 | Fairweather | ........ | B23Q 11/0046 125/13.01 |
| 2011/0192262 A1* | 8/2011 | Loveless | .............. | B23D 59/006 83/168 |
| 2016/0332244 A1* | 11/2016 | Koegel | .............. | B23Q 17/2404 |

FOREIGN PATENT DOCUMENTS

| | | |
|---|---|---|
| RU | 2010143872 | 5/2012 |
| RU | 2455130 C2 | 7/2012 |
| RU | 2471612 C2 | 1/2013 |
| RU | 2011140126 | 4/2013 |
| RU | 2013137230 A | 7/2015 |
| SU | 1186504 A | 10/1985 |
| SU | 1222499 | 4/1986 |
| SU | 19930215 A1 | 2/1993 |

* cited by examiner

CIRCULAR SAW APPARATUS WITH INTEGRATED MULTISTAGE FILTRATION SYSTEM

CROSS-REFERENCE TO RELATED APPLICATIONS

This application claims the benefit of U.S. Provisional Patent Application Ser. No. 62/212,372, filed Aug. 31, 2015, which is titled "CIRCULAR SAW APPARATUS WITH INTEGRATED MULTISTAGE FILTRATION SYSTEM" and its entire contents of which are incorporated herein by reference.

TECHNICAL FIELD

The subject disclosure generally relates to dust collection, and more specifically to facilitating dust collection within a circular saw apparatus via a multistage filtration system.

BACKGROUND

When using conventional power saws, the release of airborne dust and particulate matter resulting from cutting a work piece is problematic. Health hazards associated with breathing in such dust is particularly problematic. Development of wet cutting devices is one solution to dust abatement, wherein water is applied at a blade cutting edge where dust is entrained to a fluid and directed to a holding area. While most wet cutting methods work relatively well, they create additional problems of waste water pollution and environmental concerns. Conventional masonry and tile saws, for instance, typically have a tub or pan of water with a pump that supplies water to the cutting head. While the saw is cutting, the water is sprayed and dispersed around the saw cutting area. Therefore, because this water can drip, spray, and potentially spill, the power saw cannot be placed in close proximity to where the actual masonry and or tile installation is taking place. The user thus spends a significant amount of time walking back and forth between the power saw and the installation area.

Accordingly, a dry operated power saw which prevents dust from escaping into the environment is desirable. To this end, it should be noted that the above-described deficiencies are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with a dust collection system. In one such aspect, an apparatus to facilitate dust collection is disclosed. Within such embodiment, the apparatus includes a vacuum source, a circular saw blade, and a worktable comprising a center slot axially aligned to the circular saw blade. Here, the center slot includes an air flow channel proximate to an anticipated point of contact between the circular saw blade and a workpiece. The vacuum source is then configured to provide a focused negative pressure beneath the worktable via the air flow channel.

In a further aspect, another apparatus to facilitate dust collection is disclosed. For this embodiment, the apparatus includes a housing comprising a vacuum source and a multistage filter. The apparatus further includes a circular saw blade and a worktable comprising a center slot axially aligned to the circular saw blade. Here, the vacuum source is configured to provide a negative pressure beneath the worktable at the center slot, and the multistage filter is configured to collect airborne dust drawn by the negative pressure from an area proximate to the center slot.

In yet another aspect, an apparatus to facilitate dust collection is disclosed, which includes a vacuum source, a circular saw blade, and a worktable. For this embodiment, the worktable comprises a center slot axially aligned to the circular saw blade, and the vacuum source is configured to provide a first negative pressure beneath the worktable at the center slot. The vacuum source is then further configured to provide a second negative pressure via an auxiliary port.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
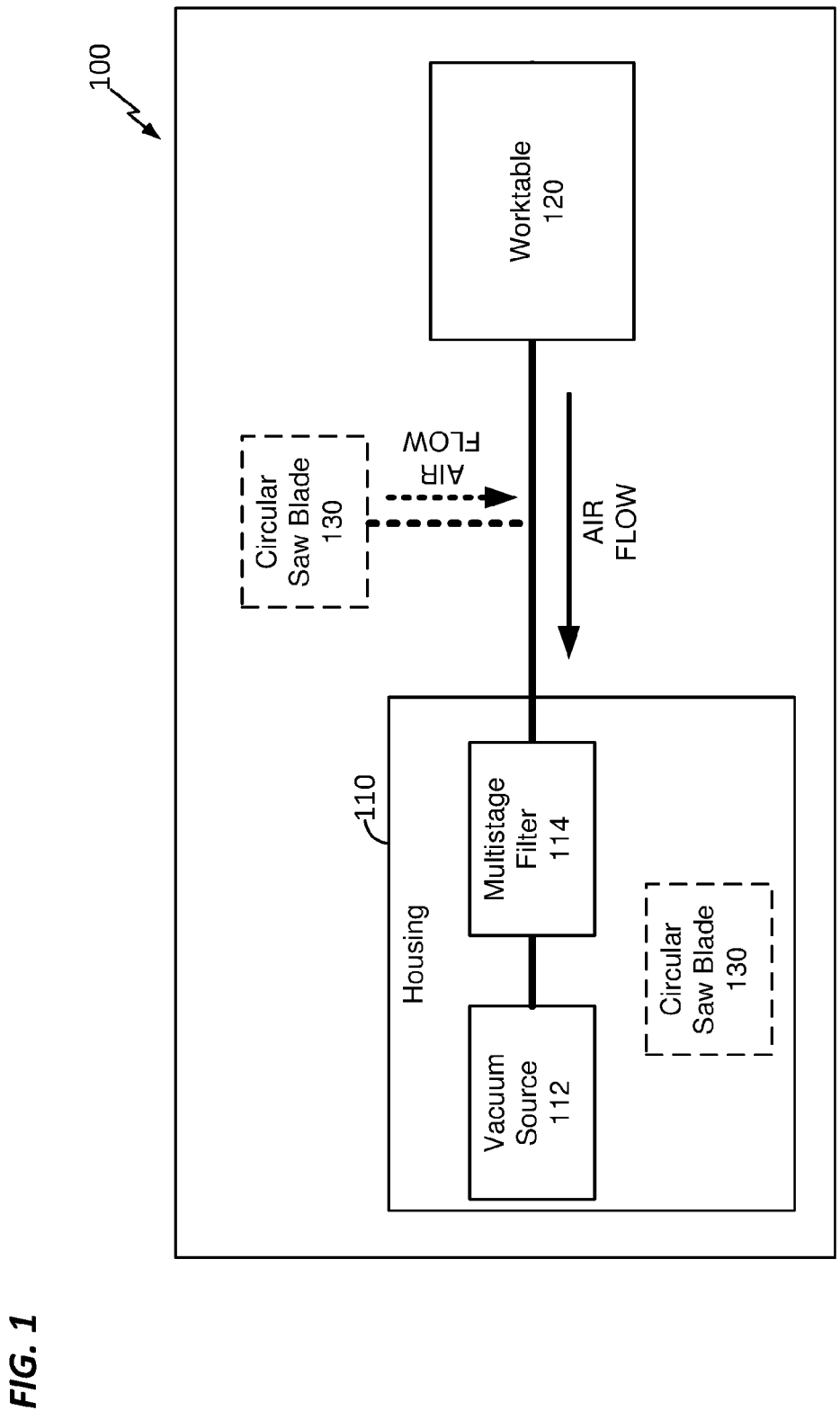
FIG. 1 is a block diagram of an exemplary apparatus that facilitates removing airborne dust via a multistage filtration system in accordance with an aspect of the subject specification.

The various embodiments disclosed herein are directed towards dust collection within a circular saw apparatus via a multistage filtration system. In FIG. 1, a block diagram is provided of an exemplary apparatus with an integrated multistage filtration system in accordance with an aspect of the subject specification. As illustrated, apparatus 100 comprises a housing 110, a worktable 120, and a circular saw blade 130, wherein the housing 110 further comprises a vacuum source 112 and a multistage filter 114. As will be discussed in greater detail below with reference to the remaining figures, it is contemplated that the worktable 120 will comprise a center slot axially aligned to the circular saw blade 130. During use, the vacuum source 112 is then configured to provide a negative pressure beneath the worktable 120 at the center slot, whereas the multistage filter 114 is configured to collect airborne dust drawn by the negative pressure from an area proximate to the center slot.

Various configurations of the apparatus 100 are contemplated and disclosed herein. For instance, in a first contemplated configuration, the worktable 120 is configured to slide above the housing 110. (See e.g., FIGS. 2-10). For this particular embodiment, in addition to providing negative pressure beneath the worktable 120 at the center slot, the vacuum source 112 also provides negative pressure in an area within a blade guard of the circular saw blade 130. Here, as illustrated, the multistage filter 114 is thus configured to collect airborne dust drawn from within the blade guard of the circular saw blade 130, in addition to dust proximate to the center slot of the worktable 120.

A chop saw configuration of the apparatus 100 is also contemplated. (See e.g., FIGS. 14-15). For this embodiment, the worktable 120 is stationary and the circular saw blade 130 is coupled to a rotatable arm. During use, the rotatable arm is lowered onto a work piece, wherein dust proximate to the center slot of the worktable 120 is again drawn towards the multistage filter 114 by the negative pressure provided by the vacuum source 112.

In another aspect of the disclosure, a table saw configuration is also contemplated. (See e.g., FIGS. 16-17). Within such embodiment, the circular saw blade 130 protrudes from the housing 110 and through the center slot of the worktable 120. During use, a work piece is pushed against the circular saw blade 130, wherein dust proximate to the center slot of the worktable 120 is again drawn towards the multistage filter 114 by the negative pressure provided by the vacuum source 112.

Exemplary Sliding Table Embodiment

Figure 2:
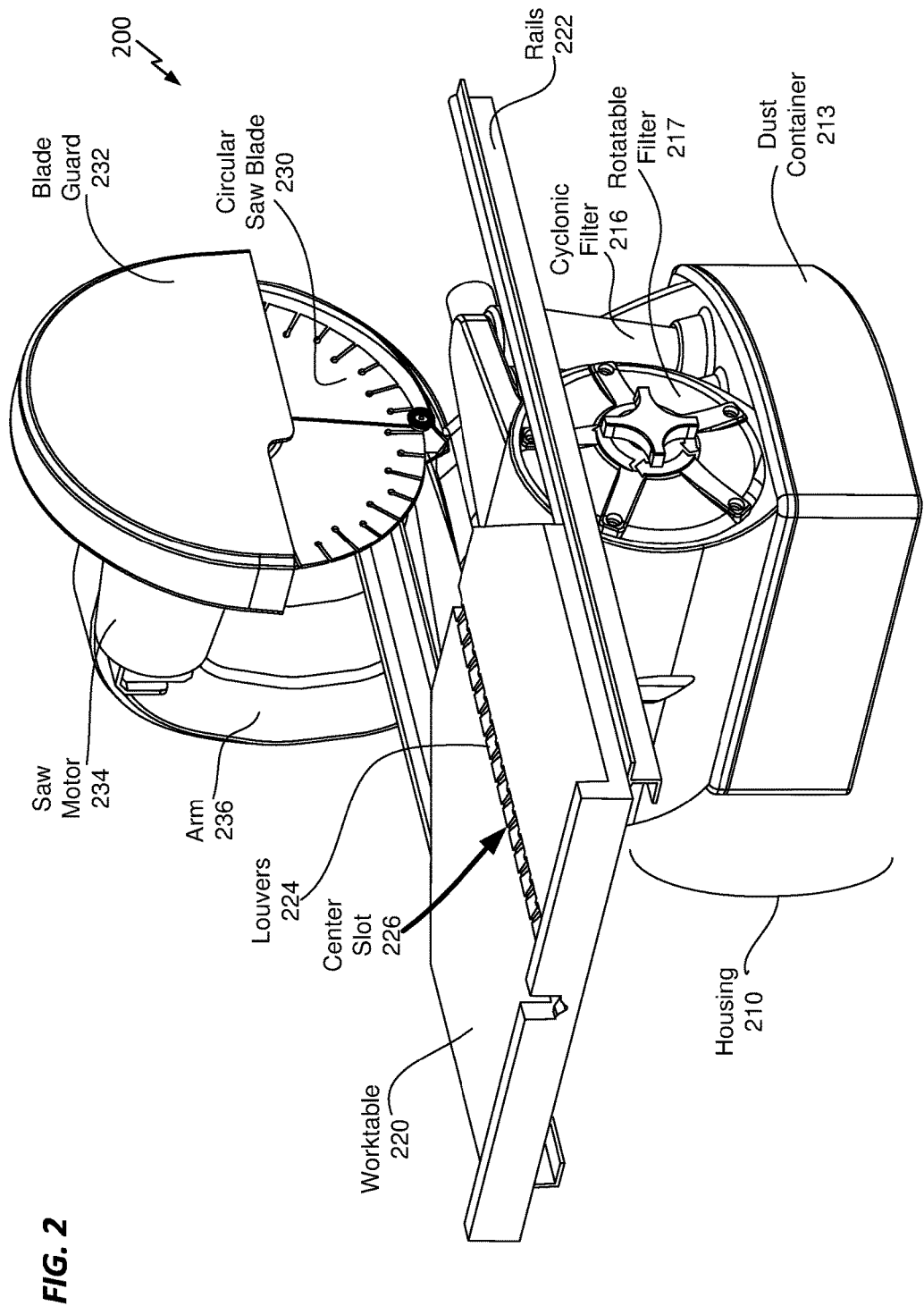
FIG. 2 is a schematic first view of an exemplary apparatus with an integrated multistage filtration system in accordance with an aspect of the subject specification.
Figure 3:
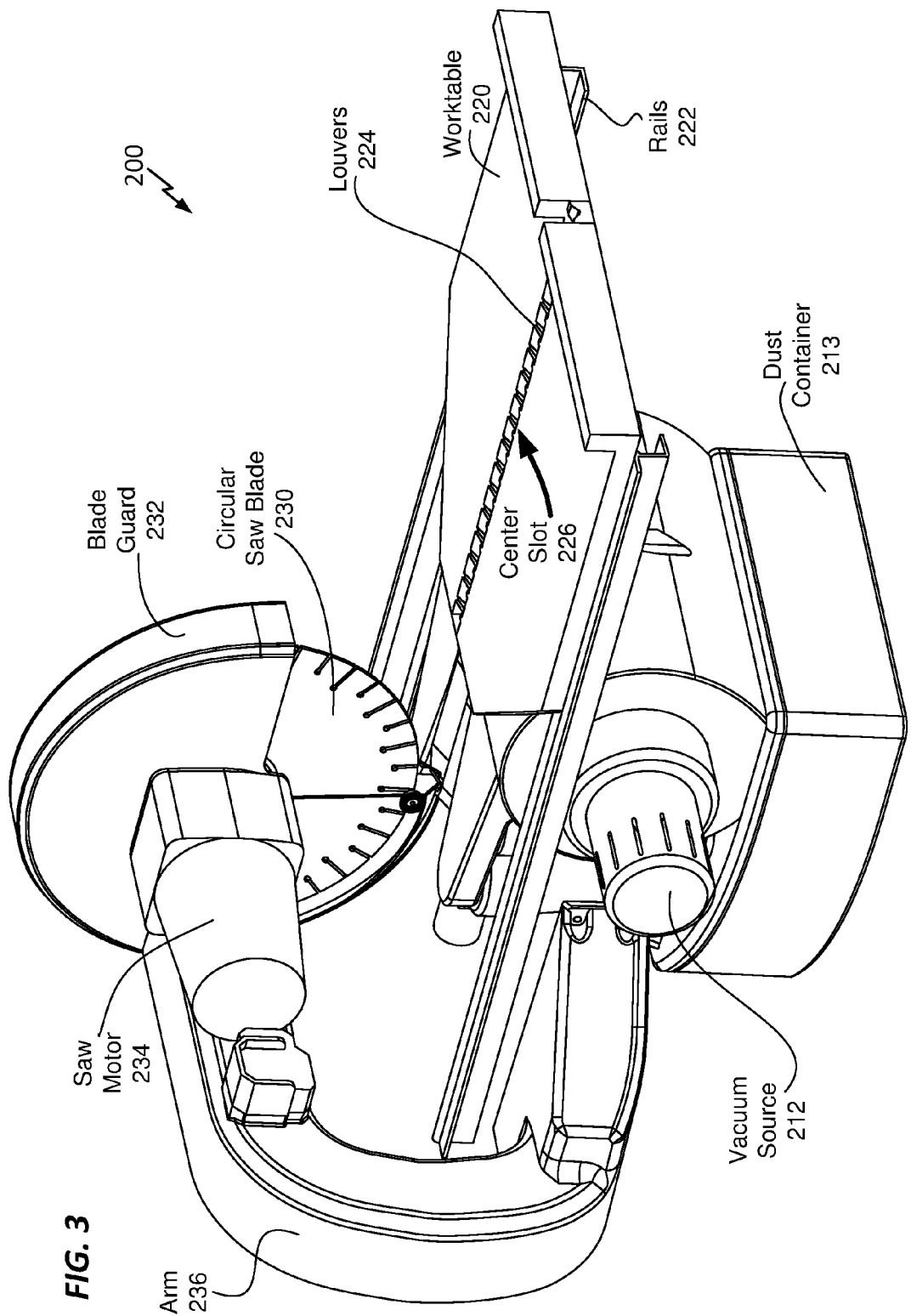
FIG. 3 is a schematic second view of an exemplary apparatus with an integrated multistage filtration system in accordance with an aspect of the subject specification.

Exemplary embodiments for the disclosed saw apparatus in which the worktable is a sliding table are now discussed in further detail. In FIGS. 2 and 3, for instance, first and second schematic views are respectively provided of such an apparatus in accordance with an aspect of the disclosure. As illustrated, the saw apparatus 200 comprises a housing 210 coupled to a worktable 220 and a circular saw blade 230, wherein the worktable 220 is configured to slide above the housing 210 via rails 222. For this embodiment, the worktable 220 is bisected by a plurality of louvers 224 strategically spaced from each other within a center slot 226 that is axially aligned with the circular saw blade 230, as shown. Furthermore, the circular saw blade 230 is powered by a saw motor 234, and firmly affixed to the housing 210 via an arm 236. For safety, a blade guard 232 may also be included.

With respect to the housing 210, it is contemplated that a multistage filter may be included. Here, for example, such multistage filter may include a rotatable filter 217 coupled to a cyclonic filter 216. A vacuum source 212 attached to the rotatable filter 217 is then configured to create an air flow through the rotatable filter 217 and the cyclonic filter 216. During use, as the worktable 220 slides over the housing 210, this air flow provides a negative pressure just below the center slot 226, wherein dust proximate to the center slot 226 is drawn through the louvers 224 towards the filters and subsequently collected into the dust container 213.

In an aspect of the disclosure, it is noted that the suction force below the center slot 226 may be diminished if the louvers 224 are obstructed. Indeed, if a substantial number of louvers 224 are obstructed (e.g., by a large work piece), such obstruction may result in an inadequate amount of suction force to collect dust. As a result, dust will undesirably remain above the worktable 220, rather than drawn below the center slot 226.

Figure 4:
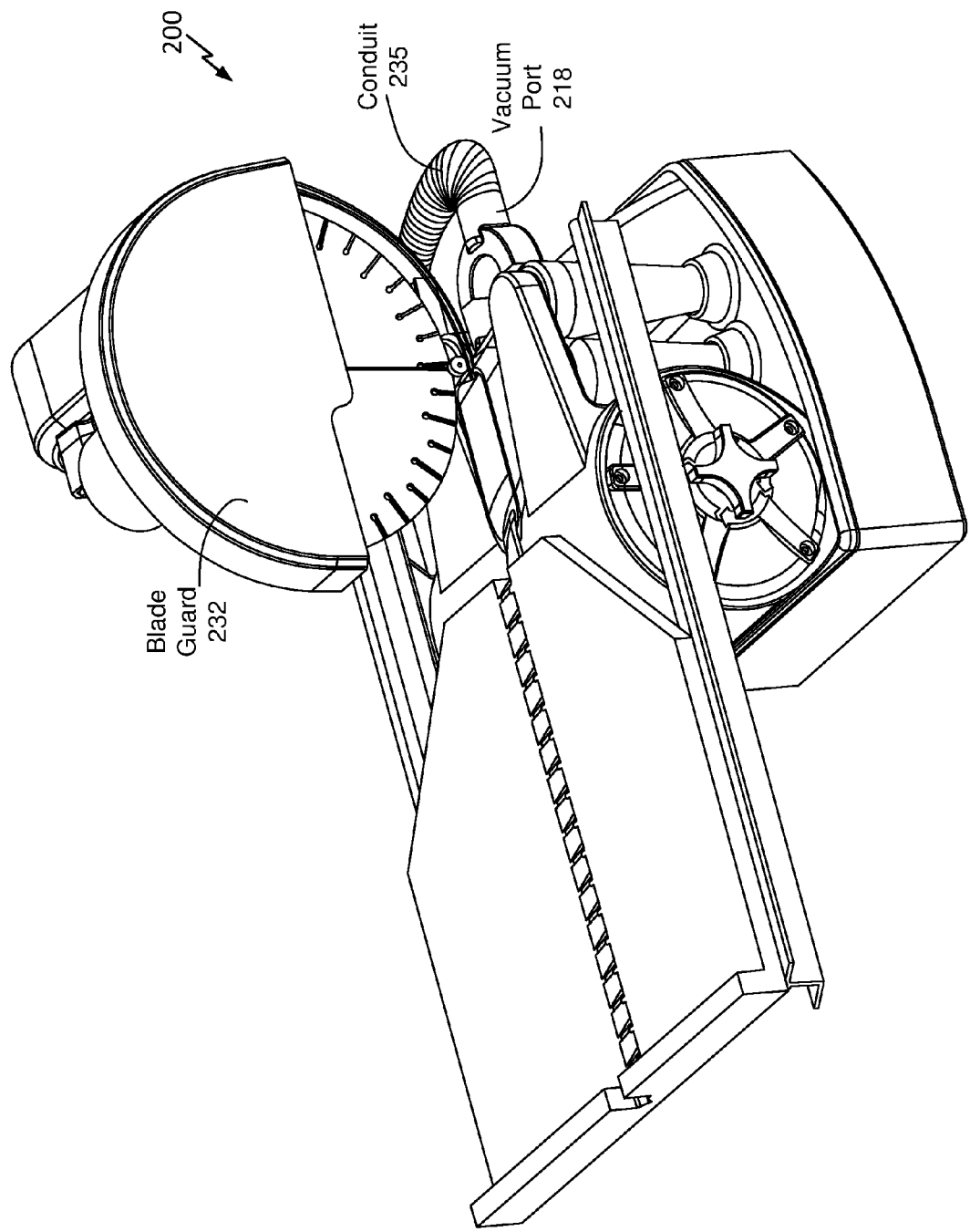
FIG. 4 is a schematic first view of an exemplary apparatus with an integrated multistage filtration system and blade guard vacuum inlet in accordance with an aspect of the subject specification.
Figure 5:
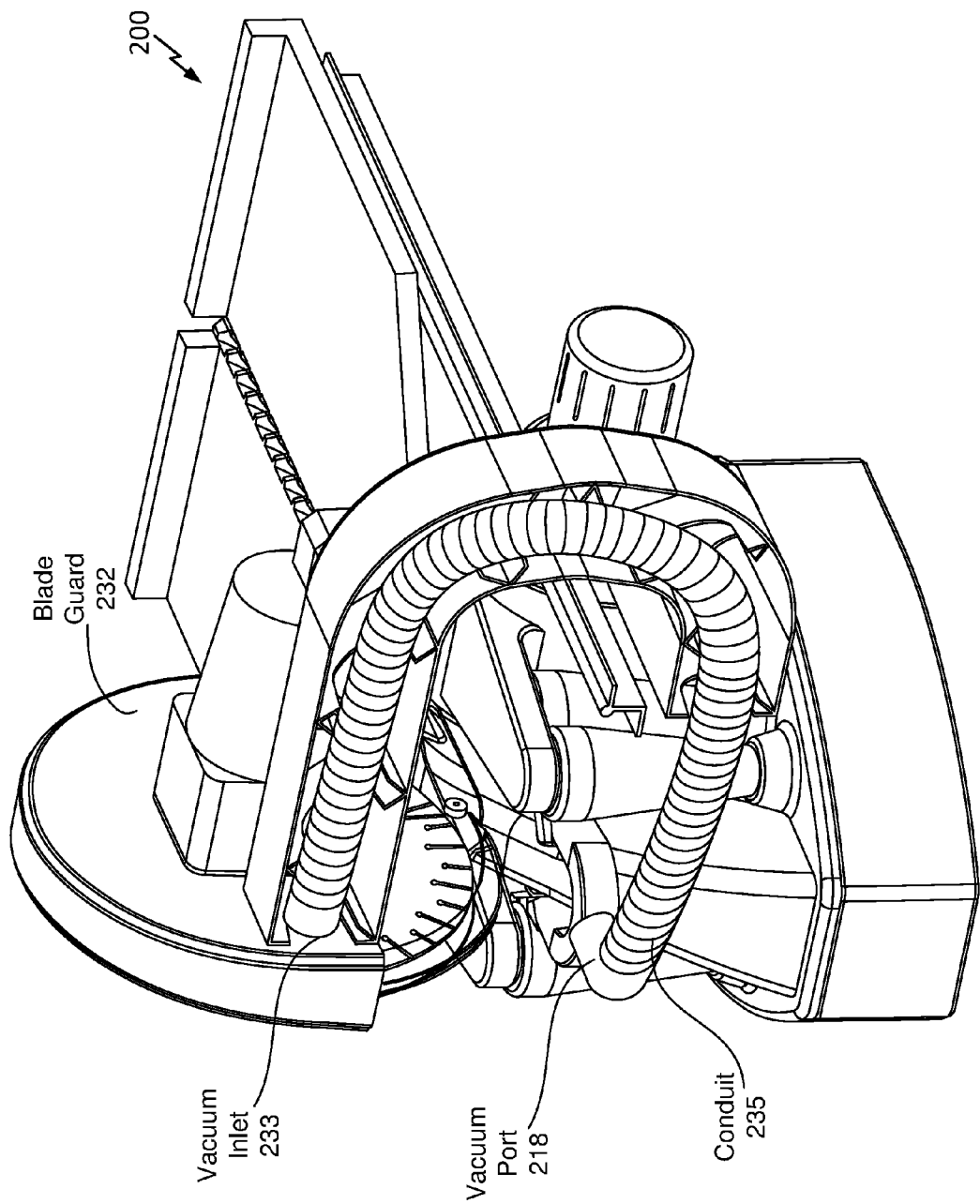
FIG. 5 is a schematic second view of an exemplary apparatus with an integrated multistage filtration system and blade guard vacuum inlet in accordance with an aspect of the subject specification.
Figure 6:
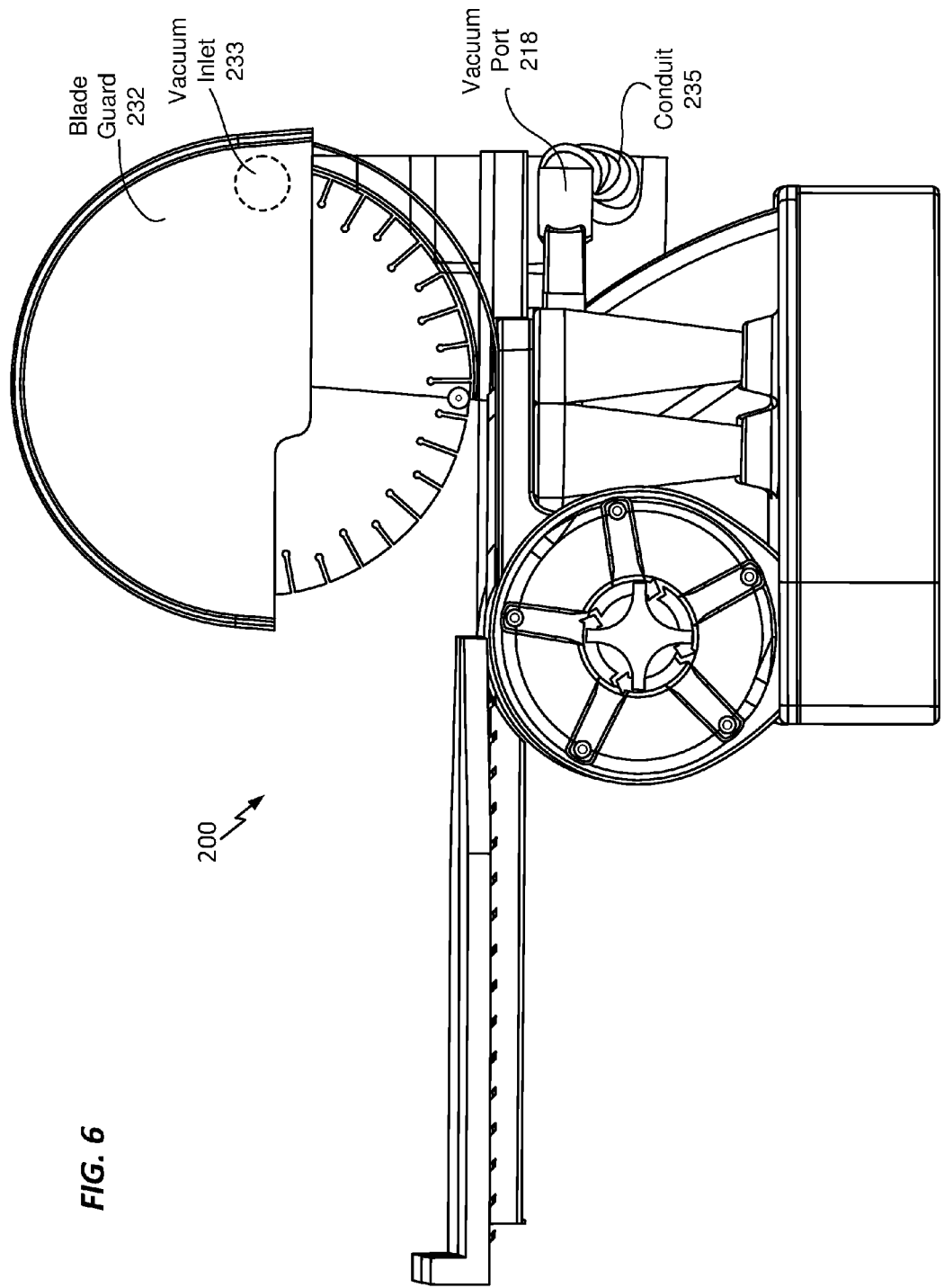
FIG. 6 is a schematic third view of an exemplary apparatus with an integrated multistage filtration system and blade guard vacuum inlet in accordance with an aspect of the subject specification.

To circumvent this problem, the configuration in FIGS. 4-6 is contemplated, wherein the air flow created by the vacuum source 212 is further extended to an area within the blade guard 232. In particular, one end of a conduit 235 is inserted into a vacuum inlet 233 on the blade guard 232, whereas the other end of the conduit 235 is connected to a vacuum port 218 on the housing 210. Within such embodiment, if there is an inadequate amount of suction force below the center slot 226, dust is then drawn up towards the vacuum inlet 233 from within the blade guard 232 where it then travels through the conduit 235 and subsequently through the filters within the housing 210.

Figure 7:
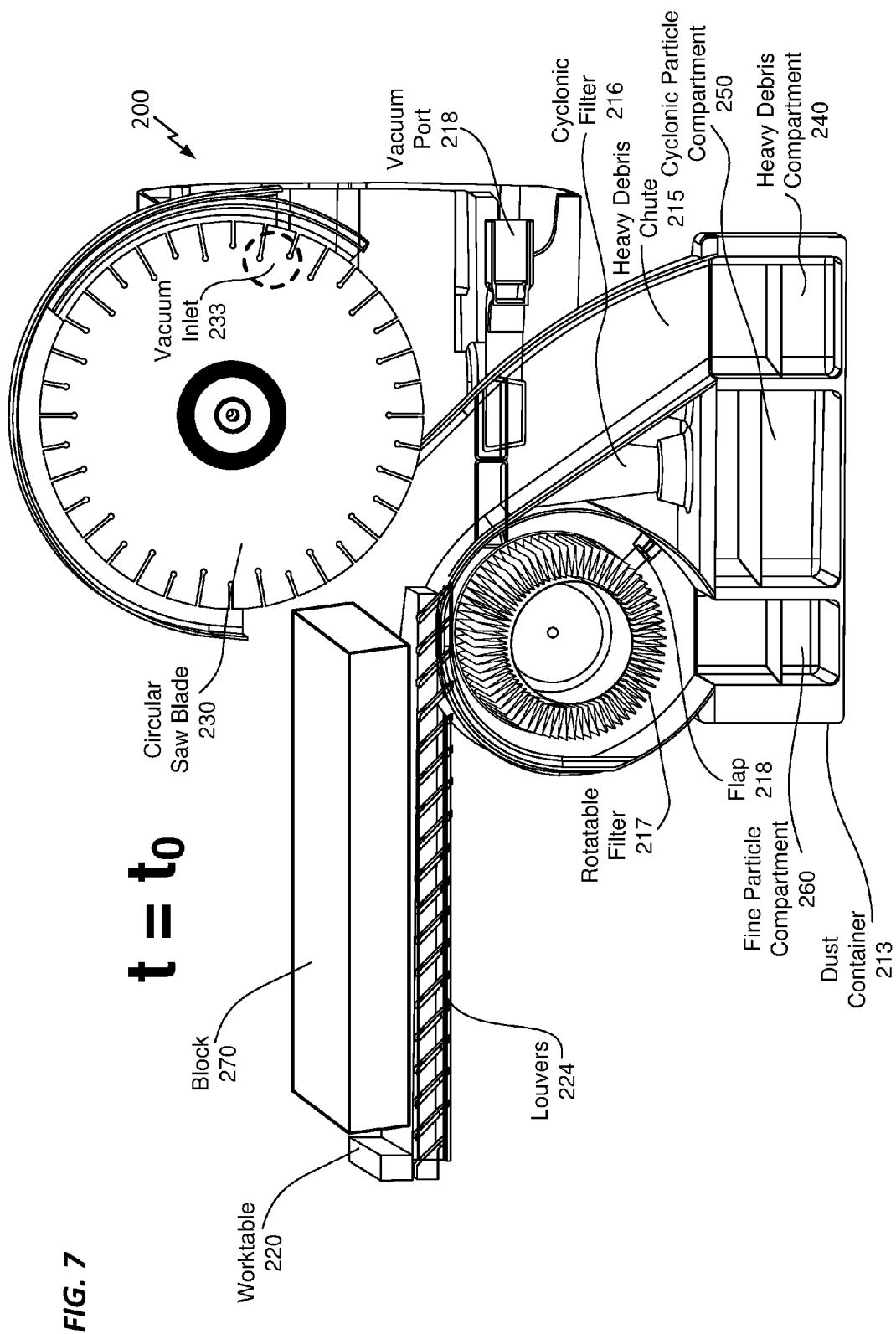
FIGS. 7-9 illustrate a time lapse of an exemplary usage of an apparatus with an integrated multistage filtration system in accordance with an aspect of the subject specification.
Figure 8:
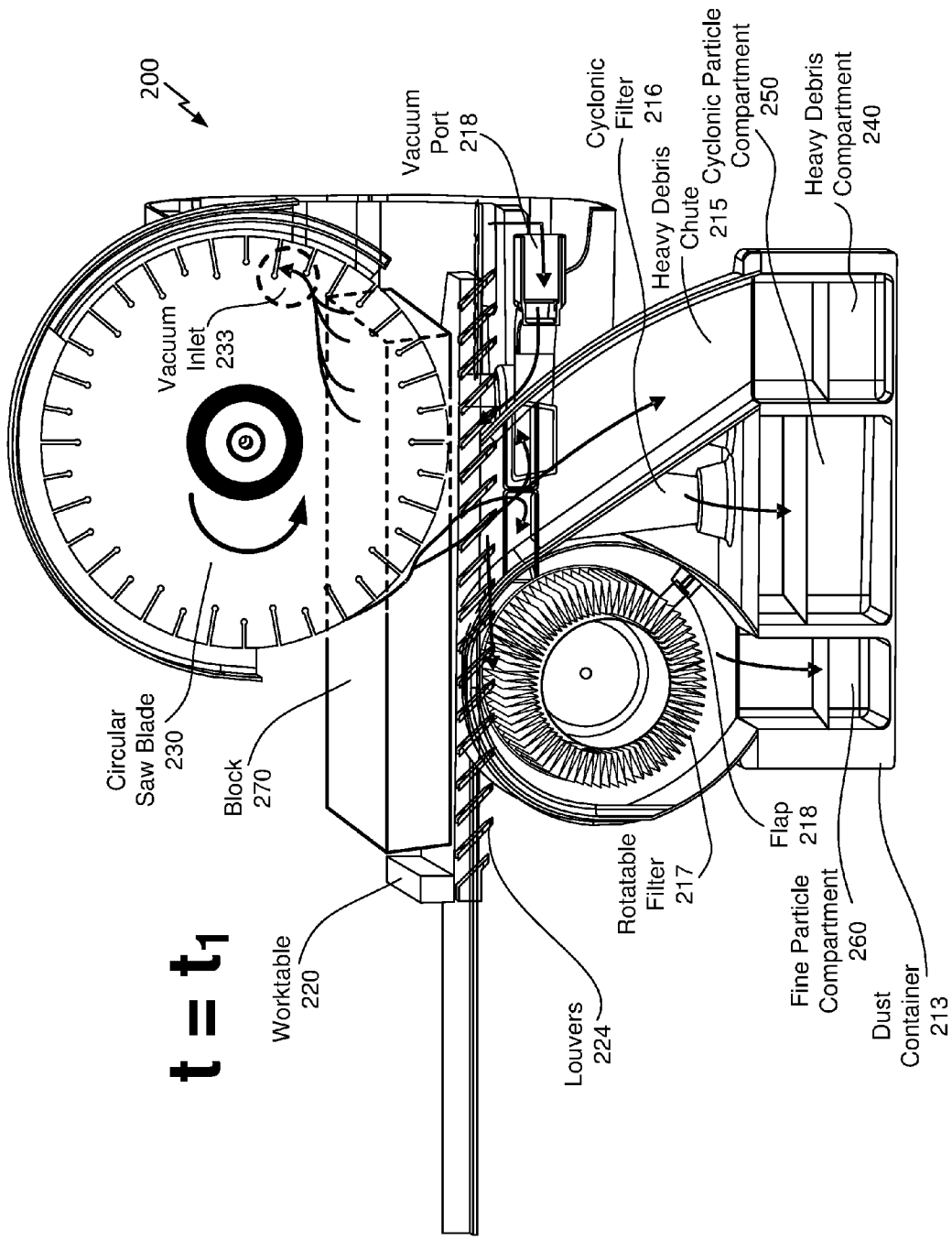
Figure 9:
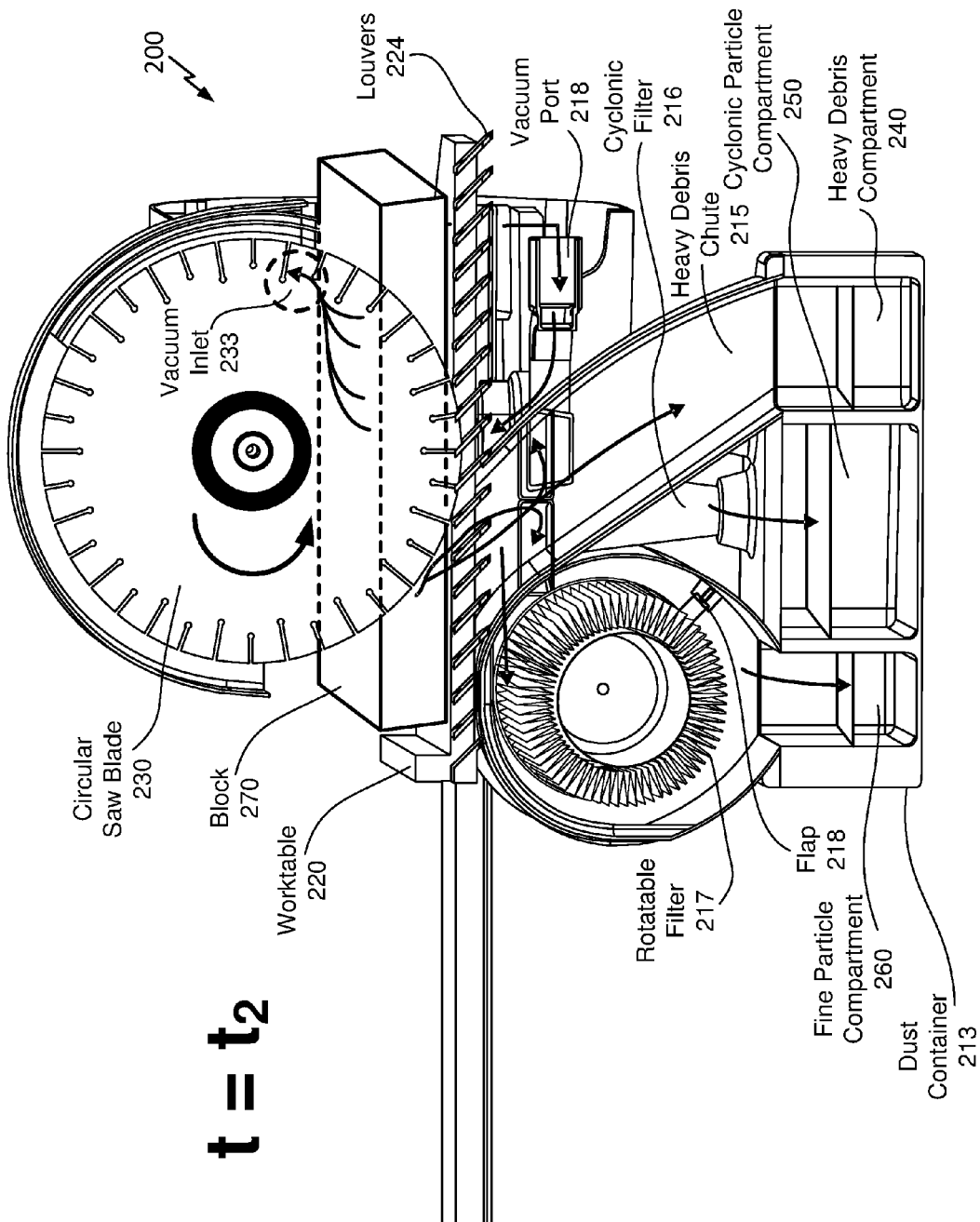
Figure 10:
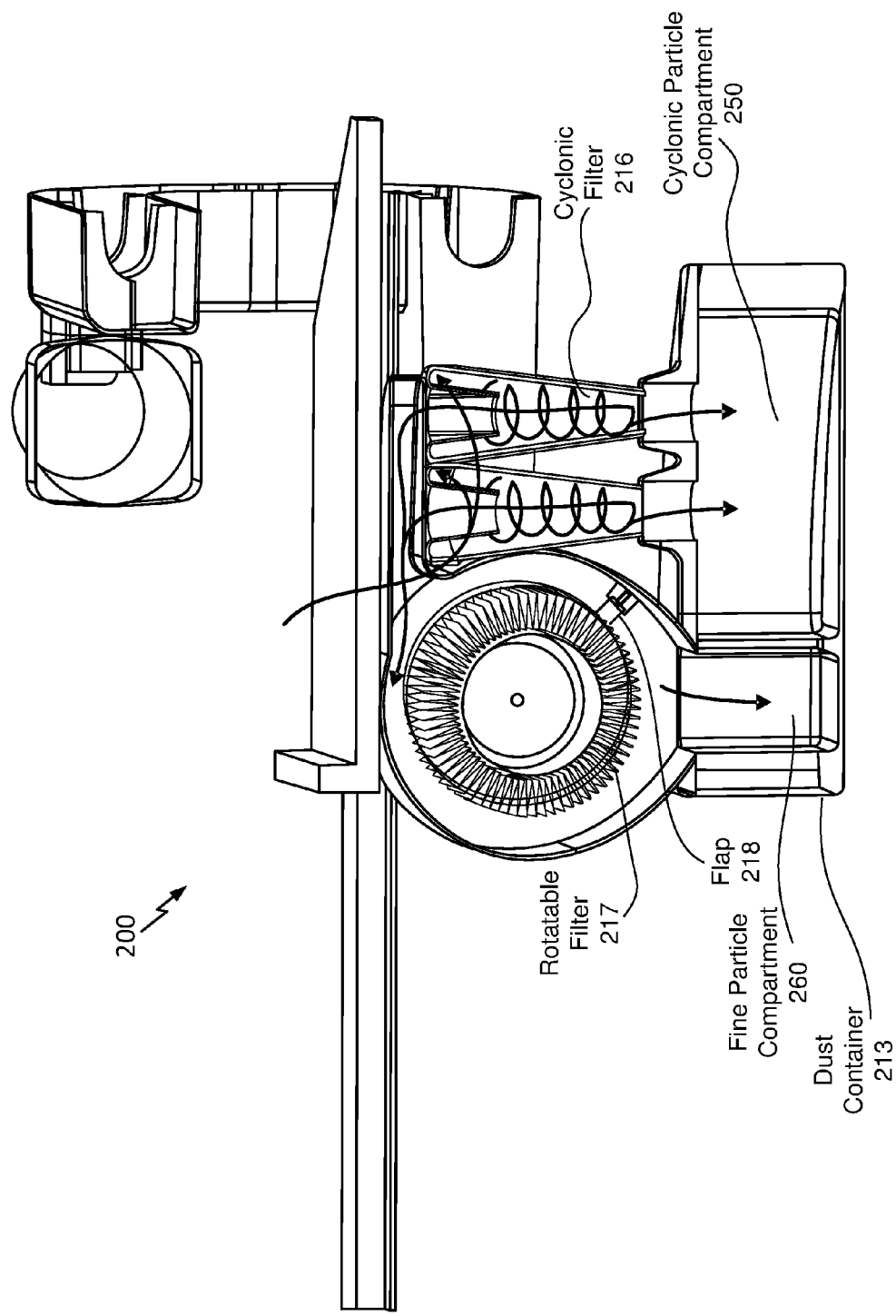
FIG. 10 illustrates a first view of an exemplary dust path within an apparatus with an integrated multistage filtration system in accordance with an aspect of the subject specification.
Figure 11:
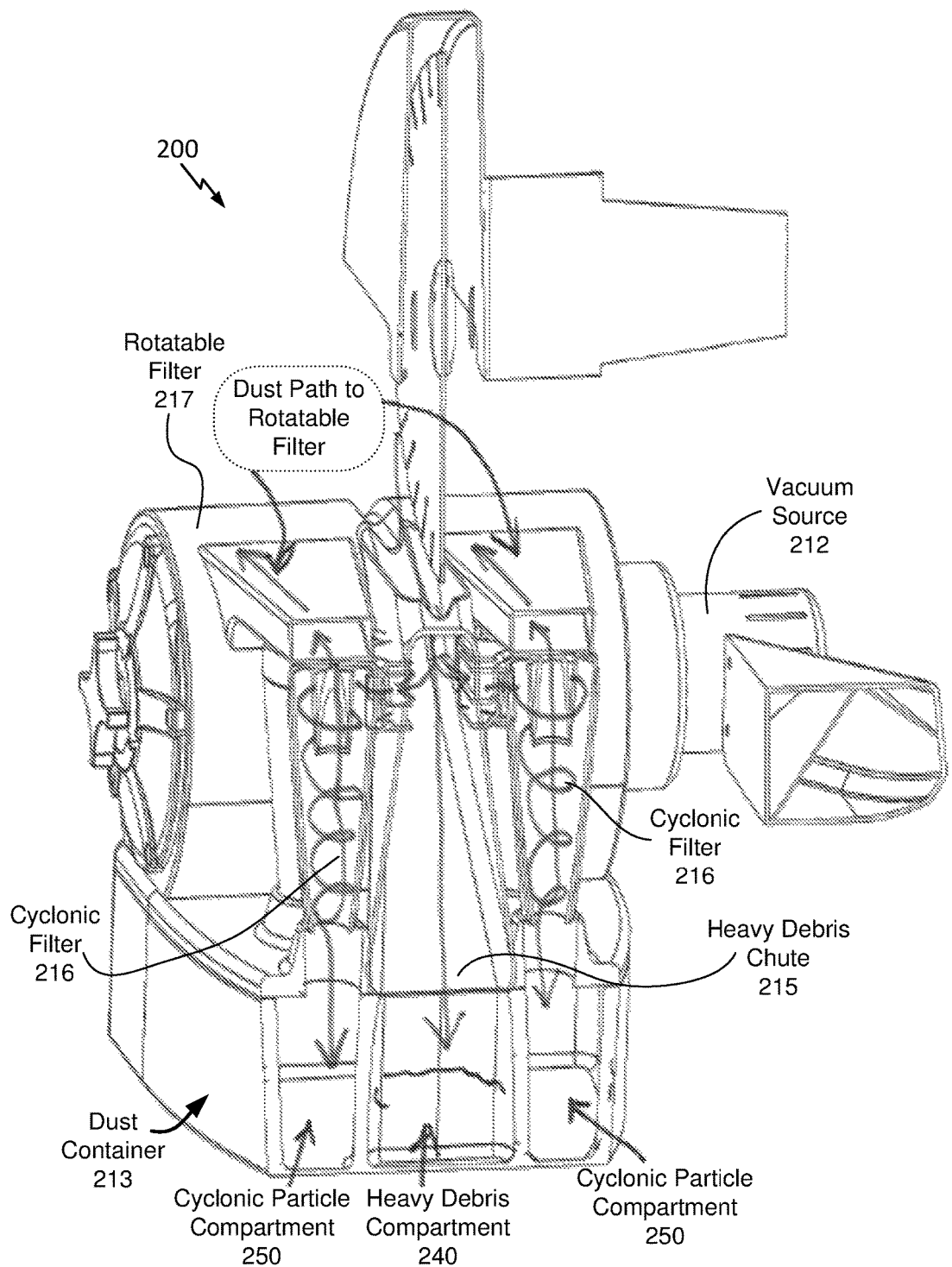
FIG. 11 illustrates a second view of an exemplary dust path within an apparatus with an integrated multistage filtration system in accordance with an aspect of the subject specification.

Referring next to FIGS. 7-9, a time lapse illustrating an exemplary usage of the apparatus 200 is provided in accordance with an aspect of the subject specification. In particular, FIG. 7 shows a cross section of the apparatus 200 at $t=t_0$, FIG. 8 shows a cross section of the apparatus 200 at $t=t_1$, and FIG. 9 shows a cross section of the apparatus 200 at $t=t_2$, wherein $t_0<t_1<t_2$. As illustrated, at $t=t_0$, a block 270 is placed on the worktable 220 away from the circular saw blade 230. At $t=t_1$, the worktable 220 is moved towards the circular saw blade 230, which generates dust as the block 270 makes contact with the circular saw blade 230. Here, because the circular saw blade 230 is rotating in a counterclockwise direction, and since the vacuum source 212 (not shown) creates a negative pressure beneath the worktable 220, the trajectory of the dust is substantially downwards. As the worktable 220 continues to slide further towards the circular saw blade 230, dust is thus collected via the particular set of louvers 234 above the heavy debris chute 215 at that time. For instance, as illustrated, dust travels through a first set of louvers 234 at $t=t_1$, whereas dust travels through a second set of louvers 234 at $t=t_2$.

It should be noted that particular parameters of the apparatus 200 may be changed, as desired, to provide different performance characteristics and/or to cut different types of work pieces (e.g., different material, different dimensions, etc.). For instance, as illustrated, the heavy debris chute 215 and each of the louvers 234 are angled so as to avoid having dust particles "bounce" back up through the louvers 234. In a particular embodiment, however, the louvers 234 may be coupled to a lever that uniformly adjusts the louvers 234 to be angled between a particular range (e.g., between 30 degrees and 45 degrees). It is contemplated that various other parameters may also be adjusted including, for example, the spacing between each of the louvers 234, the rotations per minute (RPM) of the circular saw blade 230, and/or the suction force provided by the vacuum source 212.

As previously stated, aspects disclosed herein provide a system in which dust may be collected via any of a plurality of filters. Here, for instance, an exemplary path traversed by dust drawn through the louvers 234 is provided in FIGS. 8-11. As illustrated, heavy debris drawn through the louvers 234 falls through the heavy debris chute 215 and into the heavy debris compartment 240, whereas lighter dust particles are pulled towards the cyclonic filters 216. As these lighter dust particles travel above the cyclonic filters 216, some dust is pulled down into the cyclonic particle compartment 250, whereas finer dust particles continue towards the rotatable filter 217.

In a particular embodiment, rotatable filter 217 is a cylindrical filter media having a plurality of pleated segments about a cylindrical surface, as shown. The rotatable filter 217 further comprises a filter cleaning flap 218 secured to a lateral partitioning wall at an interior of the rotatable filter 217, wherein the filter cleaning flap 218 contacts the pleated segments when the filter cleaning knob is rotated. Moreover, as the rotatable filter 217 rotates, the filter cleaning flap 218 removes dust from the pleated segments, which falls into fine particle compartment 260.

As illustrated, dust may also be drawn via the vacuum inlet 233. As previously stated, a first end of a conduit 235 may be inserted into the vacuum inlet 233, whereas the other end of the conduit 235 is connected to a vacuum port 218 on the housing 210. Here, if there is an inadequate amount of suction force below the center slot 226, dust is drawn up towards the vacuum inlet 233 where it then travels through the conduit 235 and subsequently through the filters within the housing 210.

Figure 12:
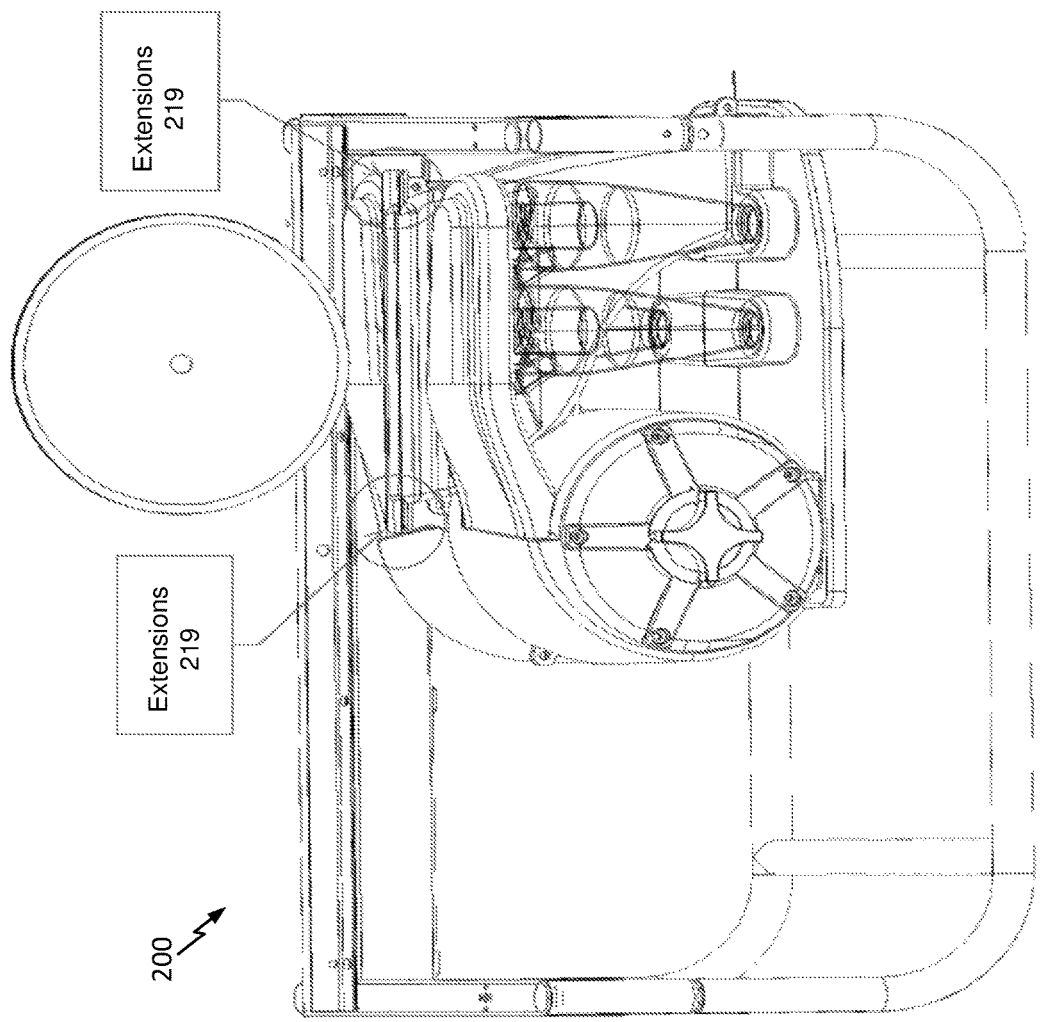
FIG. 12 is a schematic first view of an exemplary apparatus with integrated extensions in accordance with an aspect of the subject specification.
Figure 13:
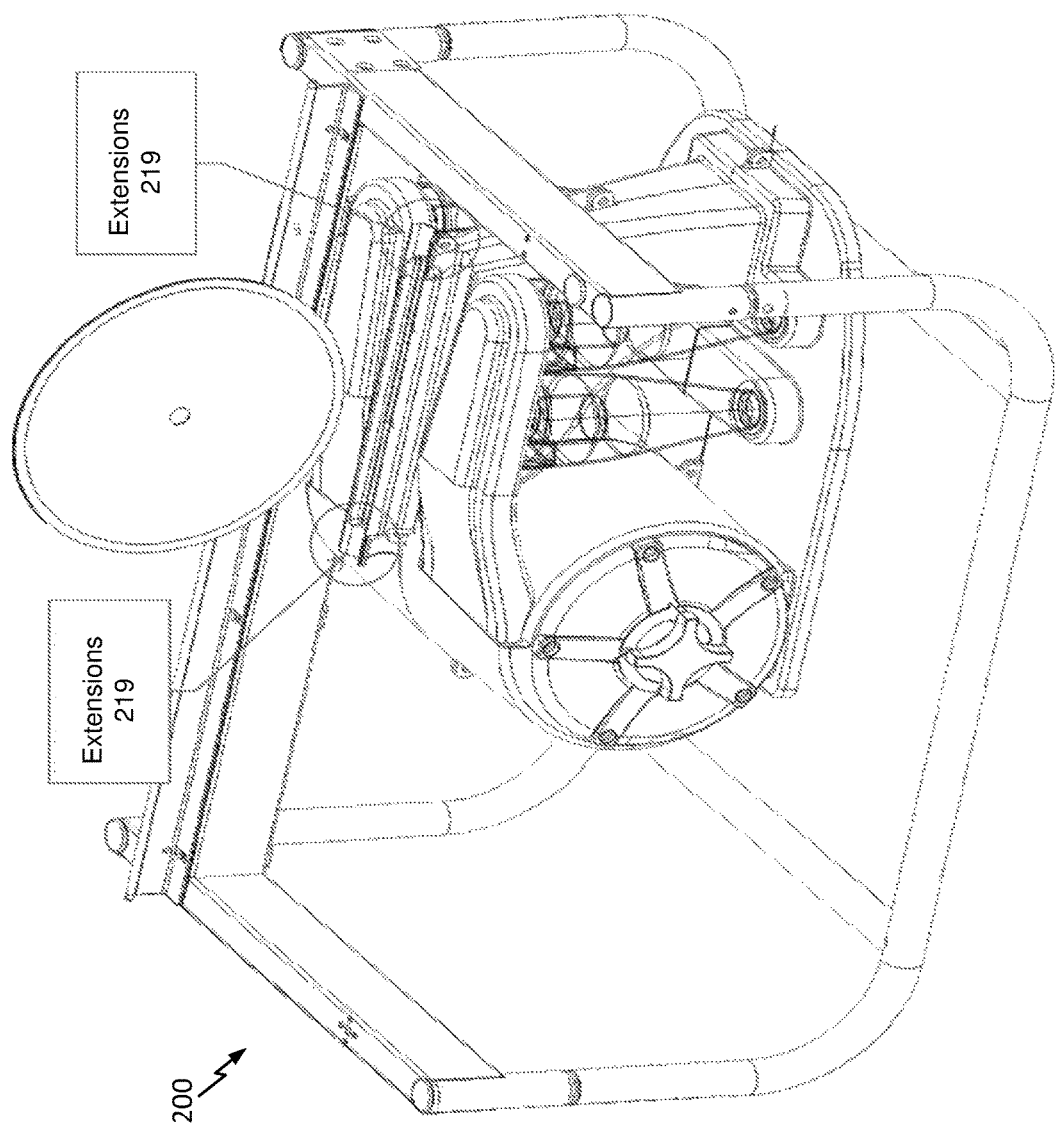
FIG. 13 is a schematic second view of an exemplary apparatus with integrated extensions in accordance with an aspect of the subject specification.

In another aspect of the disclosure, aspects for minimizing vacuum flow loss are contemplated. For instance, as illustrated in FIGS. 12-13, the apparatus 200 may be further configured to include extensions 219 along the air flow path. Within such embodiment, the extensions 219 are placed on each end of the dust collection slot where they may communicate with the louvers 224. As the worktable 220 slides towards the circular saw blade 230, these extensions 219 plug off the preceding set of louvers 224 to minimize vacuum flow losses underneath the worktable 220.

Exemplary Chop Saw Embodiment

Figure 14:
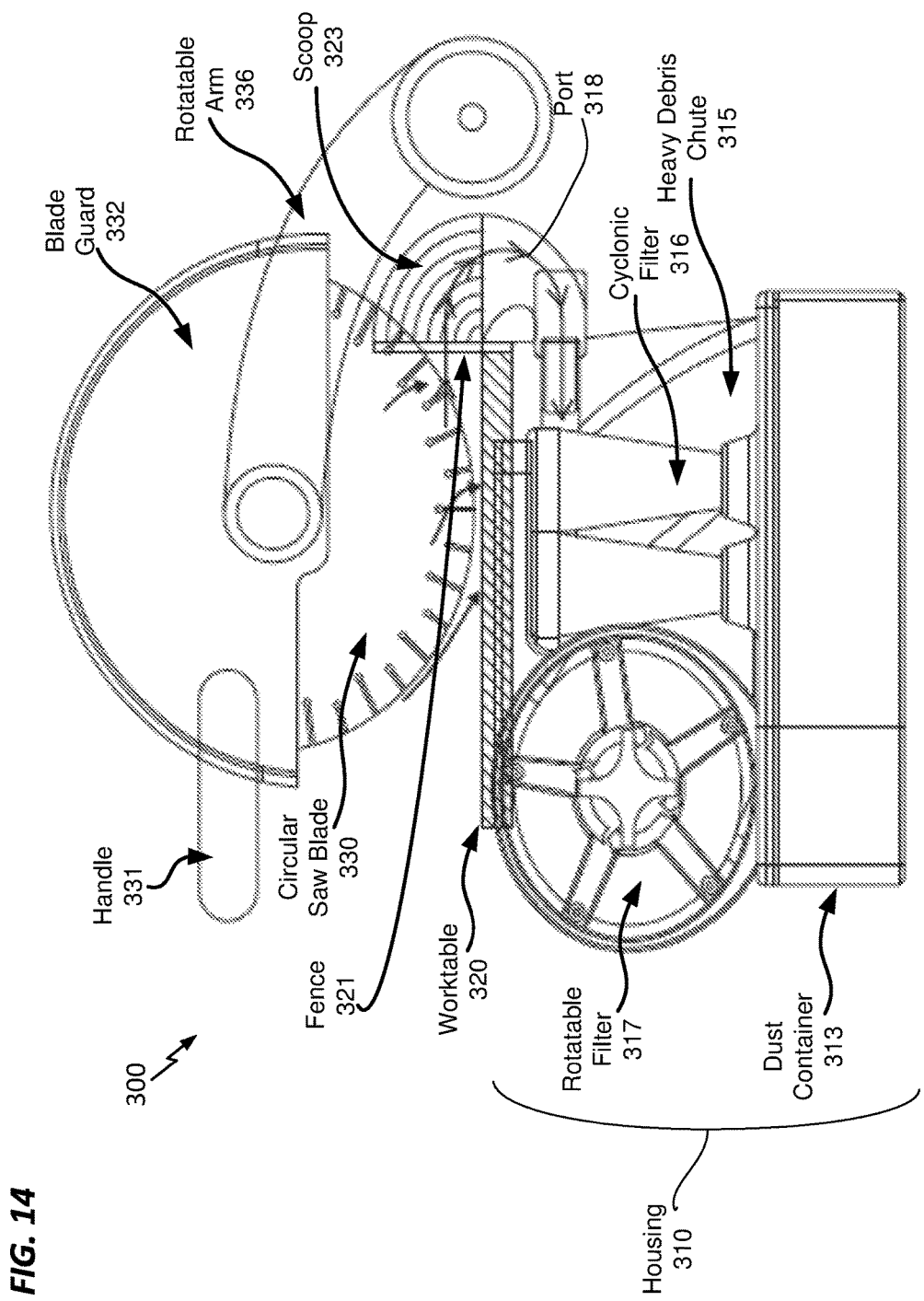
FIG. 14 is a schematic first view of an exemplary chop saw configuration in accordance with an aspect of the subject specification.
Figure 15:
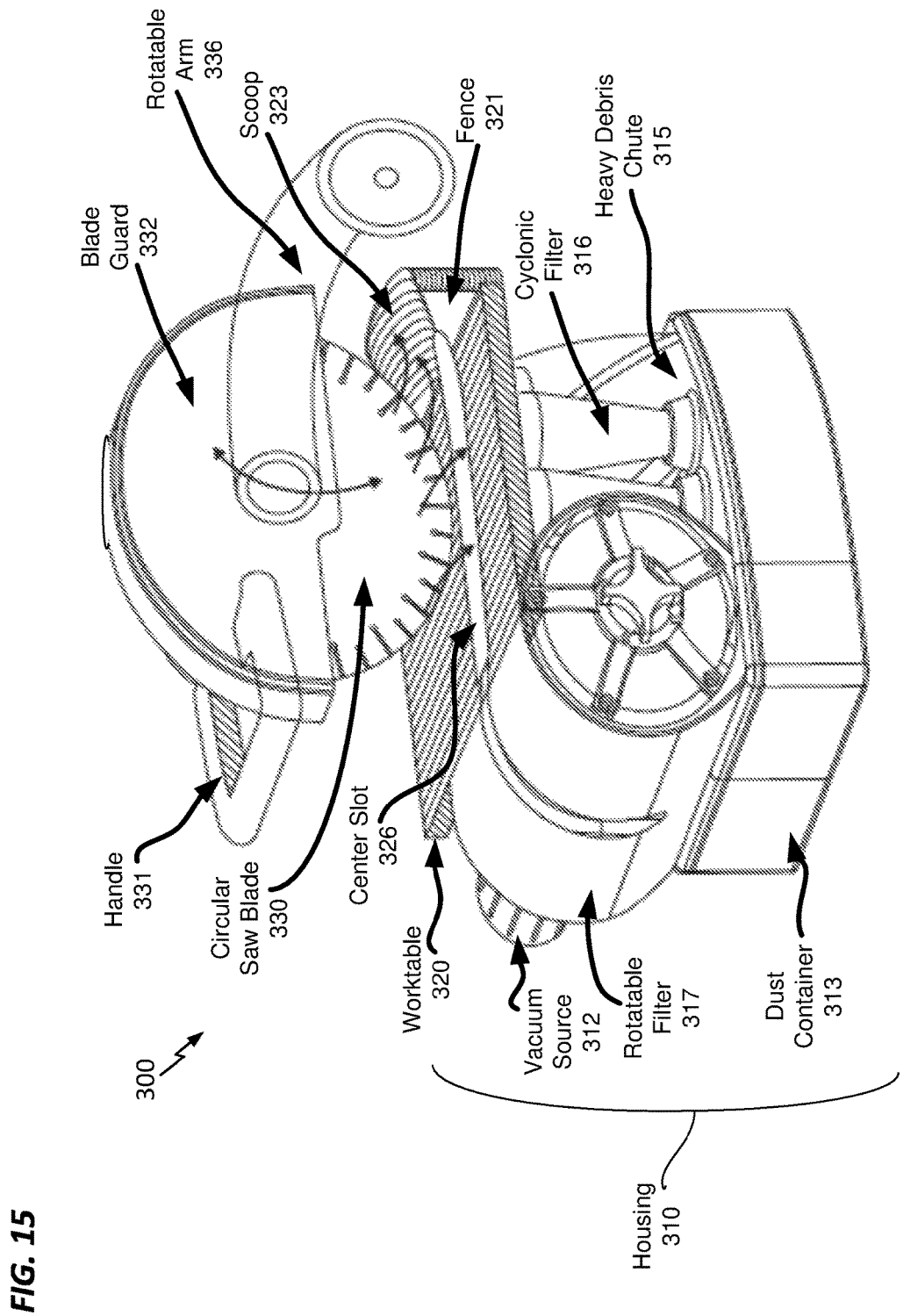
FIG. 15 is a schematic second view of an exemplary chop saw configuration in accordance with an aspect of the subject specification.

Referring next to FIGS. 14-15, schematic illustrations are provided of a chop saw configuration in accordance with aspects disclosed herein. As illustrated, a chop saw apparatus 300 comprises a housing 310 coupled to a worktable 320 and a circular saw blade 330, wherein the worktable 320 is configured as a stationary table above the housing 310. For this embodiment, similar to the worktable 220 of apparatus 200, the worktable 320 comprises a center slot 326 that is axially aligned with the circular saw blade 330, as shown. Here, however, the circular saw blade 330 is attached to a rotatable arm 336, wherein a handle 331 on the blade guard 332 is used to raise and lower the circular saw blade 330 during use.

With respect to the housing 310 of apparatus 300, it should be appreciated that the components therein are substantially similar to the corresponding components of the housing 210 of apparatus 200. For instance, housing 310 also includes a multistage filter, which comprises a rotatable filter 317 coupled to a cyclonic filter 316, wherein a vacuum source 312 attached to the rotatable filter 317 is again configured to create an air flow through the rotatable filter 317 and cyclonic filter 316. During use, this air flow provides a negative pressure just below the center slot 326 so that dust is drawn through the center slot 326 towards the filters and subsequently collected into the dust container 313. In particular, heavy debris drawn through the center slot 326 falls through the heavy debris chute 315 and into the dust container 313, whereas lighter dust particles are pulled towards the cyclonic filters 316. As these lighter dust particles travel above the cyclonic filters 316, some dust is pulled down into the dust container 313, whereas finer dust particles continue towards the rotatable filter 317.

In addition to pulling dust down through the center slot 326, however, the apparatus 300 is configured to pull dust back towards a scoop 323, as shown. Within such embodiment, vacuum source 312 thus provides a suction force both through the center slot 326 and through the scoop 323. To this end, dust drawn through the scoop 323 travels through the vacuum port 318 and towards the filters. Here, it should be appreciated that the scoop 323 may be comprised of brush or finger-like material. A fence 321 may also be included, as shown.

Exemplary Table Saw Embodiment

Figure 16:
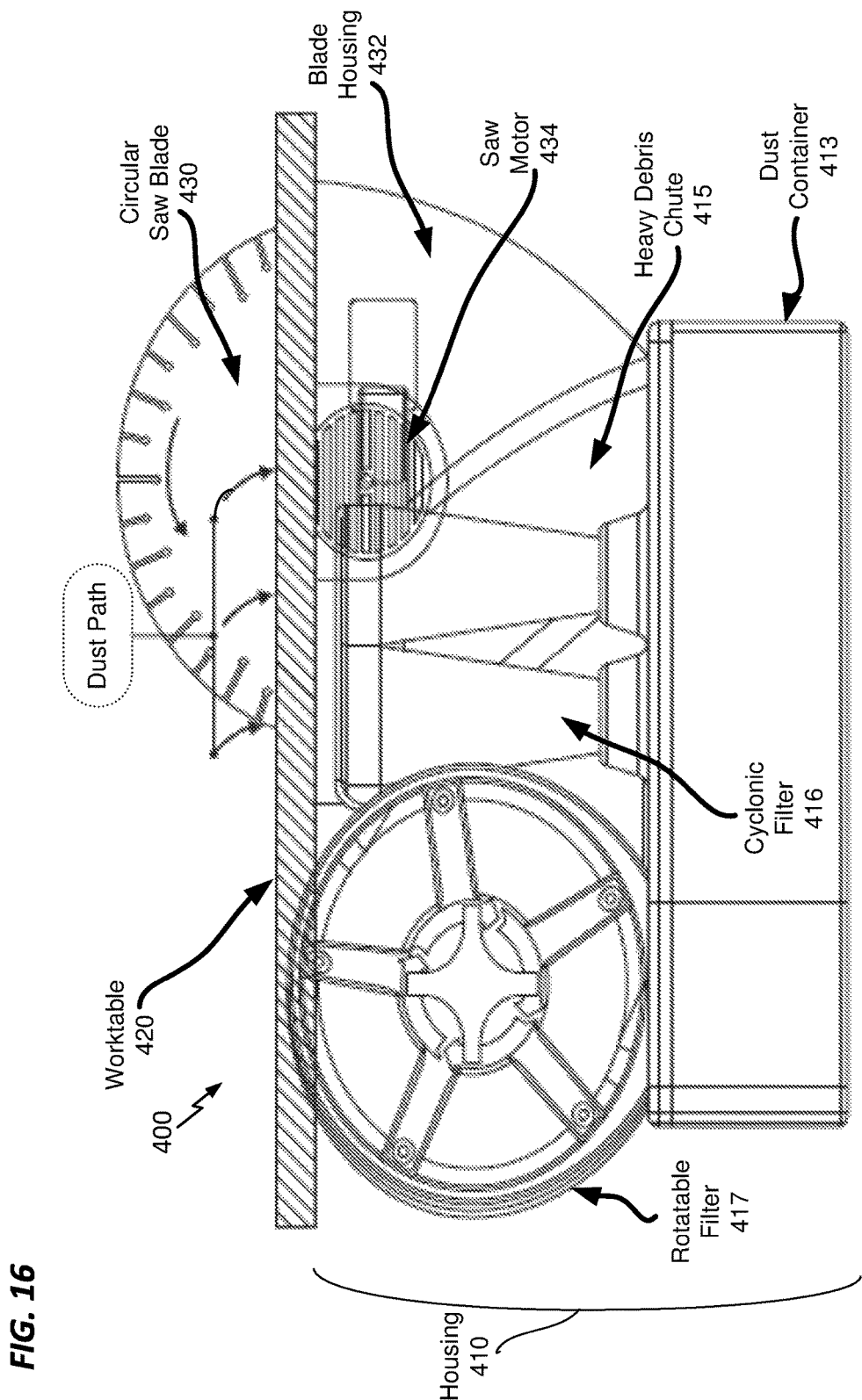
FIG. 16 is a schematic first view of an exemplary table saw configuration in accordance with an aspect of the subject specification.
Figure 17:
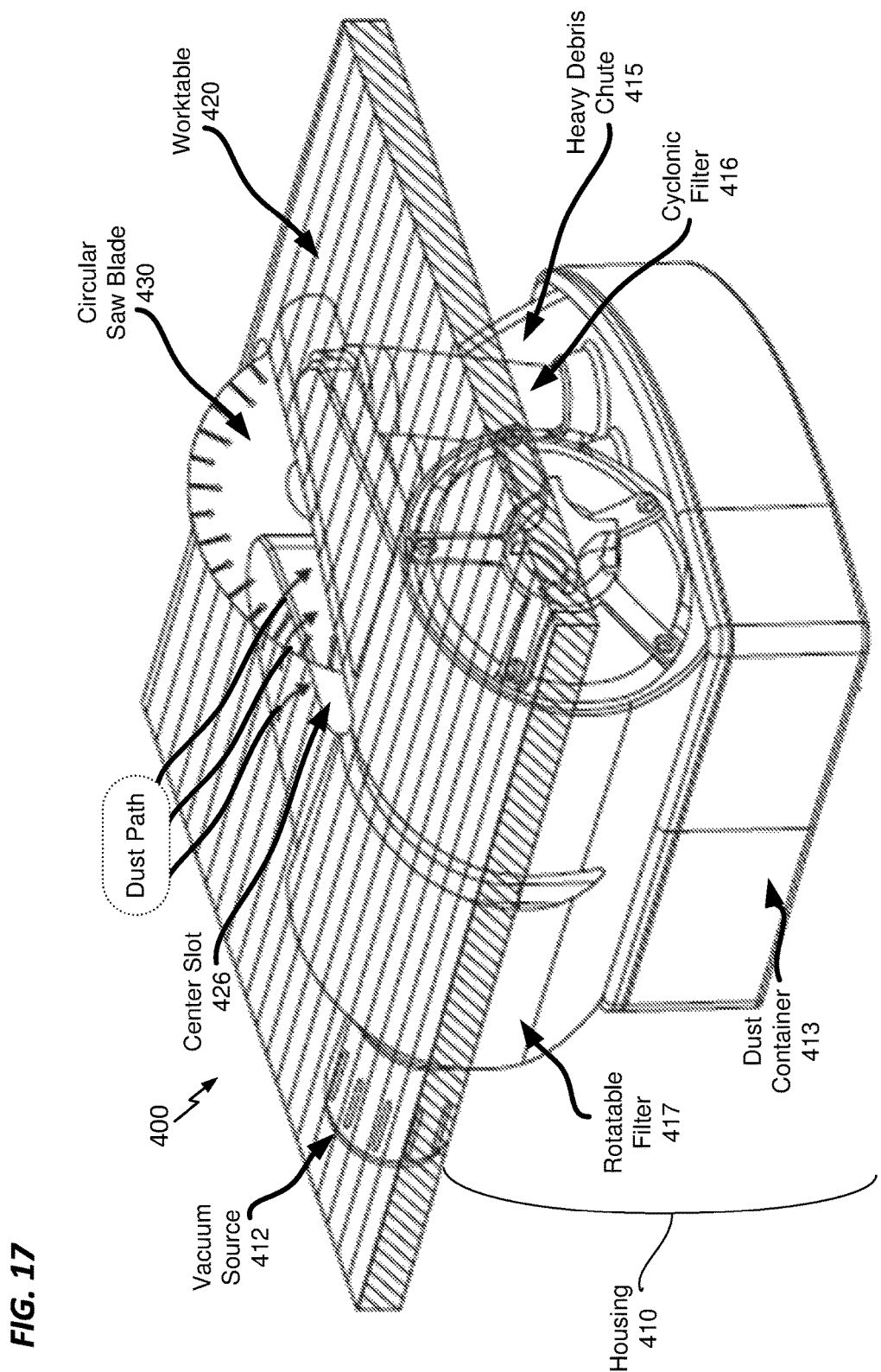
FIG. 17 is a schematic second view of an exemplary table saw configuration in accordance with an aspect of the subject specification.
Figure 18:
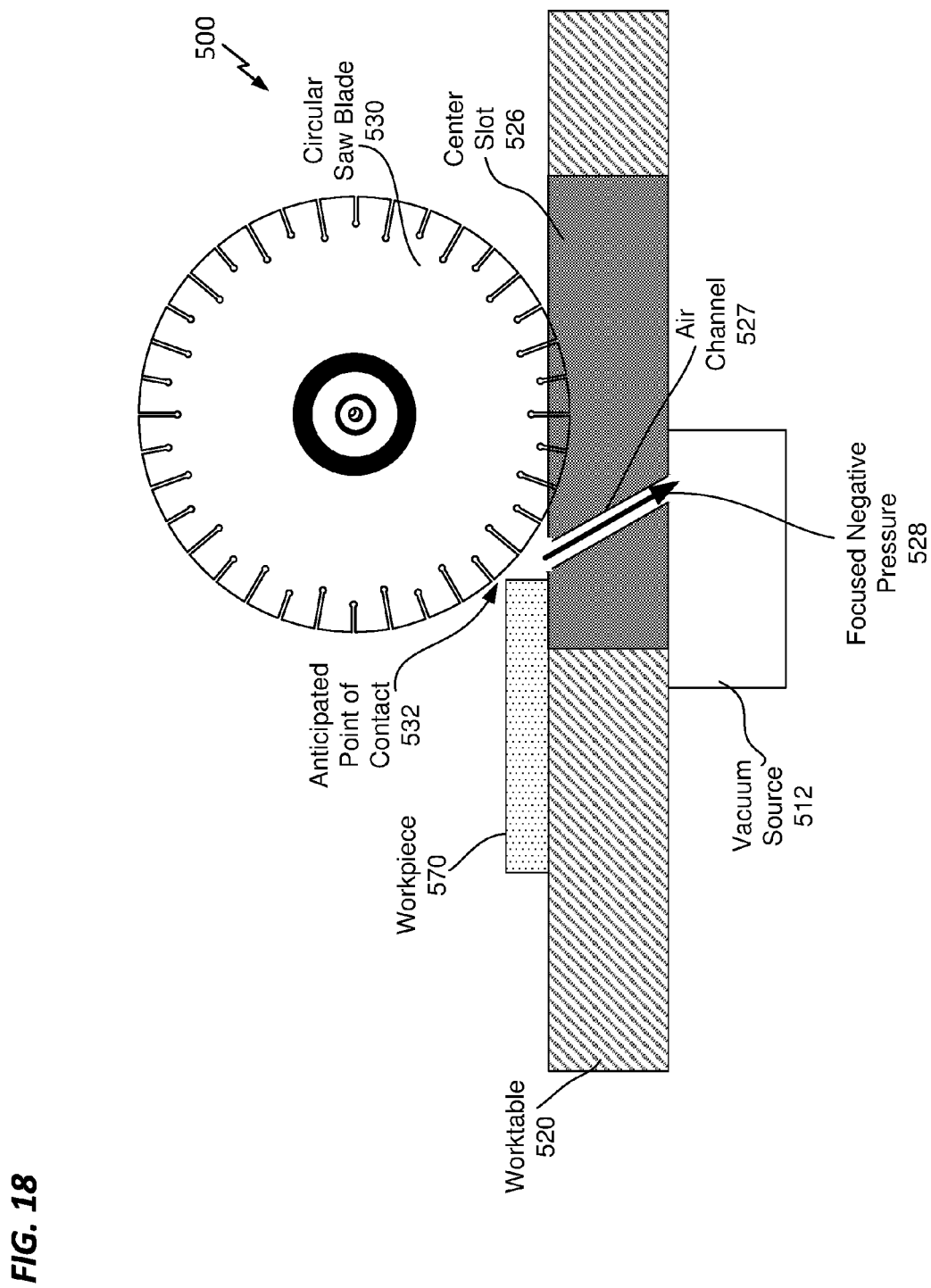
FIG. 18 is a side view of an exemplary apparatus that facilitates blade cooling in accordance with an aspect of the subject specification.
Figure 19:
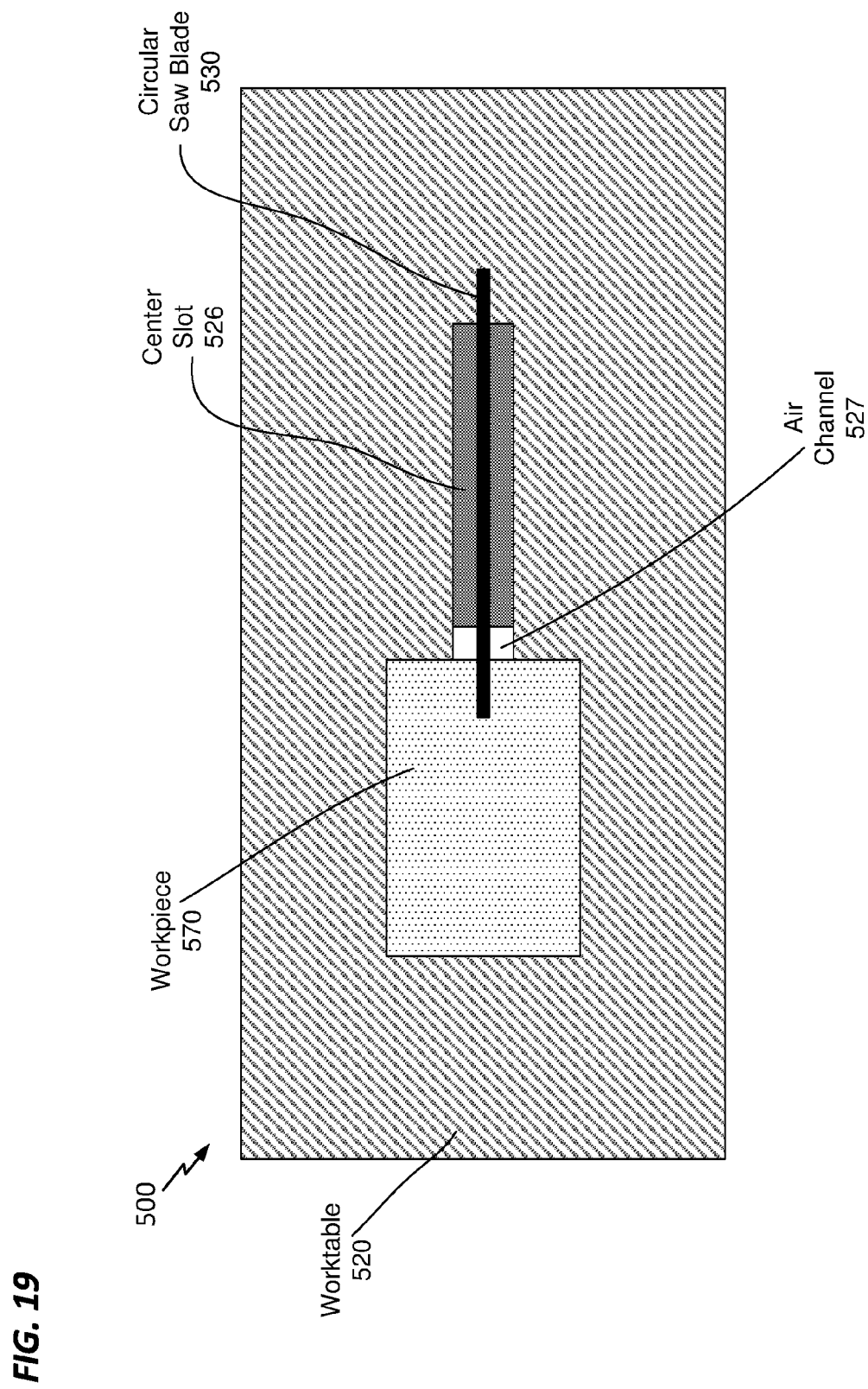
FIG. 19 is a top view of an exemplary apparatus that facilitates blade cooling in accordance with an aspect of the subject specification.

Referring next to FIGS. 16-17, schematic illustrations are provided of a table saw configuration in accordance with aspects disclosed herein. As illustrated, a table saw apparatus 400 comprises a housing 410 coupled to a worktable 420 and a circular saw blade 430, wherein the worktable 420 is configured as a stationary table above the housing 410. For this embodiment, similar to the worktable 220 of apparatus 200, the worktable 420 comprises a center slot 426 that is axially aligned with the circular saw blade 430, as shown. Here, however, the circular saw blade 430 protrudes through the center slot 426 of the worktable 420. Furthermore, the circular saw blade 430 and the saw motor 434 are housed within a blade housing 432 beneath the worktable 420, wherein the blade housing 432 is substantially within housing 410, as shown.

With respect to the remaining components of the housing 410, it should be appreciated that these components are substantially similar to the corresponding components of the housing 210 of apparatus 200. For instance, housing 410 also includes a multistage filter, which comprises a rotatable filter 417 coupled to a cyclonic filter 416, wherein a vacuum source 412 attached to the rotatable filter 417 is again configured to create an air flow through the rotatable filter 417 and cyclonic filter 416. During use, this air flow provides a negative pressure just below the center slot 426 so that dust is drawn through the center slot 426 towards the filters and subsequently collected into the dust container 413. In particular, heavy debris drawn through the center slot 426 falls through the heavy debris chute 415 and into the dust container 413, whereas lighter dust particles are pulled towards the cyclonic filters 416. As these lighter dust particles travel above the cyclonic filters 416, some dust is pulled down into the dust container 413, whereas finer dust particles continue towards the rotatable filter 417.

Exemplary Blade Cooling Aspects

Referring next to FIGS. 18-22, illustrations are provided showing various blade cooling aspects disclosed herein. To this end, it should be appreciated that cooling a circular saw blade during "dry cut" use is particularly desirable to achieve optimal performance and to reduce the possibility of damage to the blade. Side and top views of an exemplary apparatus that facilitates blade cooling in accordance with an aspect of the subject specification are respectively provided in FIGS. 18 and 19. Here, it should be appreciated that apparatus 500 is substantially similar to the aforementioned apparatuses 100, 200, 300, and 400, wherein individual components of apparatus 500 are also substantially similar to individual components of apparatuses 100, 200, 300, and 400. As illustrated, apparatus 500 includes a vacuum source 512, a circular saw blade 530, and a worktable 520 comprising a center slot 526 axially aligned to the circular saw blade 530. Here, the center slot 526 includes an air flow channel 527 proximate to an anticipated point of contact 532 between the circular saw blade 530 and a workpiece 570. The vacuum source 512 is then configured to provide a focused negative pressure 528 beneath the worktable 520 via the air flow channel 527.

By properly aligning air flow channel 527 with the anticipated point of contact 532 between the circular saw blade 530 and a workpiece 570, it has been discovered that a significant cooling of the circular saw blade 530 is achieved. Namely, because the circular saw blade 530 can get very hot at the anticipated point of contact 532 during use, utilizing the focused negative pressure 528 to cool the circular saw blade 530 at the anticipated point of contact 532 is particularly desirable.

Figure 20:
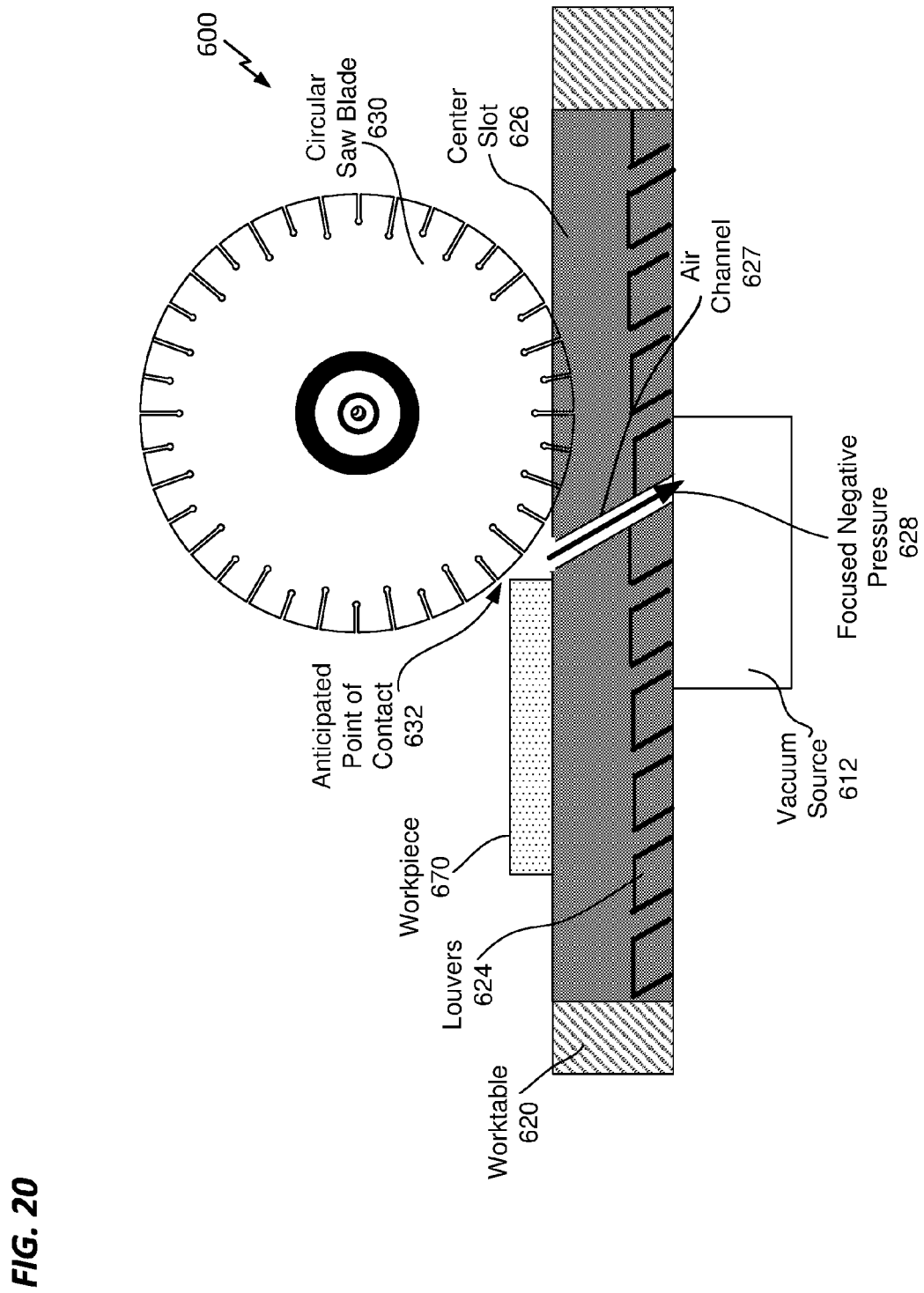
FIG. 20 is a side view of an exemplary apparatus with louvers that facilitates blade cooling in accordance with an aspect of the subject specification.

For embodiments where a sliding worktable is used, other configurations are contemplated. In FIG. 20, for instance, a side view of an exemplary apparatus with a sliding worktable that utilizes louvers to facilitate blade cooling is provided. Here, it should be appreciated that apparatus 600 is substantially similar to the aforementioned apparatus 200, wherein individual components of apparatus 600 are also substantially similar to individual components of apparatus 200. As illustrated, apparatus 600 includes a vacuum source 612, a circular saw blade 630, and a worktable 620 comprising a center slot 626 axially aligned to the circular saw blade 630. Here, the center slot 626 includes an air flow channel 627 proximate to an anticipated point of contact 632 between the circular saw blade 630 and a workpiece 670. The vacuum source 612 is then configured to provide a focused negative pressure 628 beneath the worktable 620 via the air flow channel 627.

For this particular embodiment, however, worktable 620 is configured to slide towards the circular saw blade 630, wherein the center slot 626 comprises a plurality of louvers 624 that individually form the air flow channel 627. Moreover, the air flow channel 627 sequentially varies according to which of the plurality of louvers 624 is proximate to the anticipated point of contact 632 as the worktable 620 slides towards the circular saw blade 630.

Figure 21:
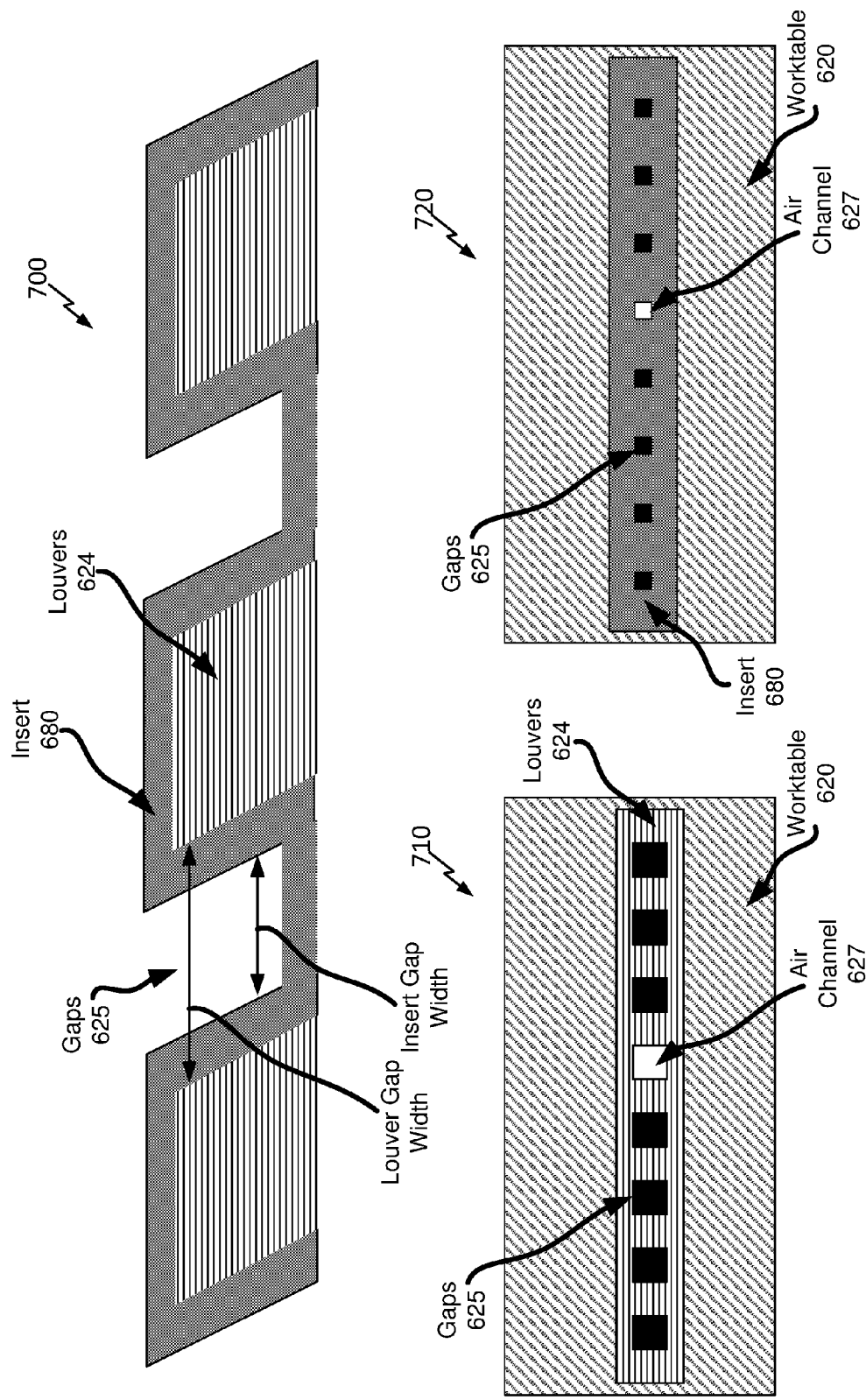
FIG. 21 illustrates various aspects of an exemplary louver insert in accordance with an aspect of the subject specification.

In an aspect of the disclosure, it has been discovered that the magnitude of the magnitude of the focused negative pressure 628 is inversely proportional to the aperture size of the air flow channel 627. Accordingly, by reducing the size of the gaps between individual louvers 624, the magnitude of the focused negative pressure 628 will increase. In order to toggle this magnitude, it is contemplated that removable louver inserts of various sizes may be used. FIG. 21, for instance, illustrates various aspects of an exemplary louver insert in accordance with an aspect of the subject specification. As shown in illustration 700, by placing insert 680 on top of louvers 624, the gaps 625 between louvers 624 are reduced. Namely, the insert gap width is less than the louver gap width, as shown.

Illustrations 710 and 720 further demonstrate this reduction in gap size, wherein illustration 710 shows worktable 620 without insert 680, whereas illustration 720 shows worktable 620 with insert 680. As illustrated, in addition to the reduction in size of gaps 625, the particular gap corresponding to air channel 627 has also been reduced in size by using insert 680. Therefore, the focused negative pressure 628 at air channel 627 in illustration 720 is greater than the focused negative pressure 628 at air channel 627 in illustration 710.

Figure 22:
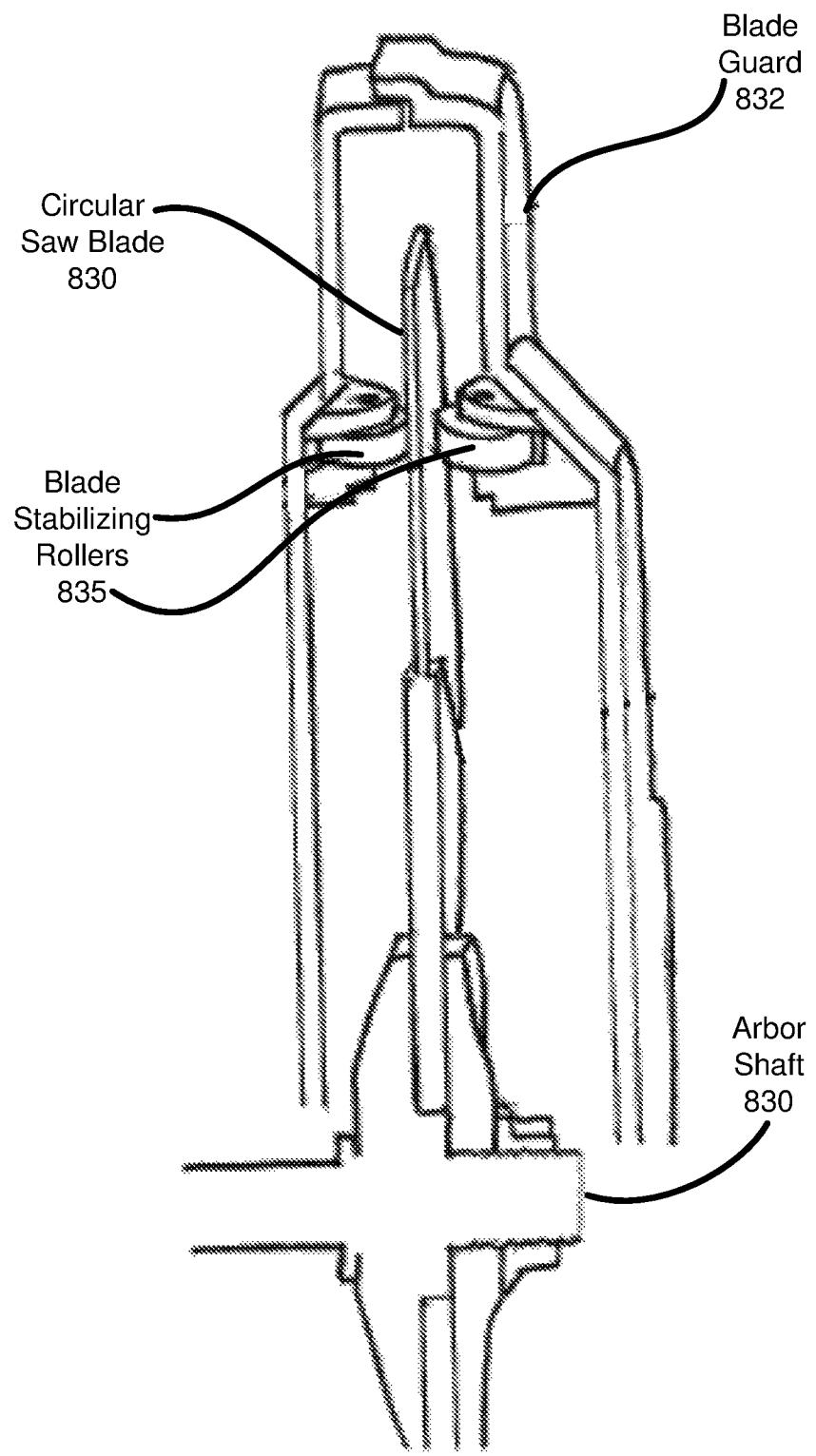
FIG. 22 is a schematic of an exemplary blade stabilizer in accordance with an aspect of the subject specification.
Figure 23:
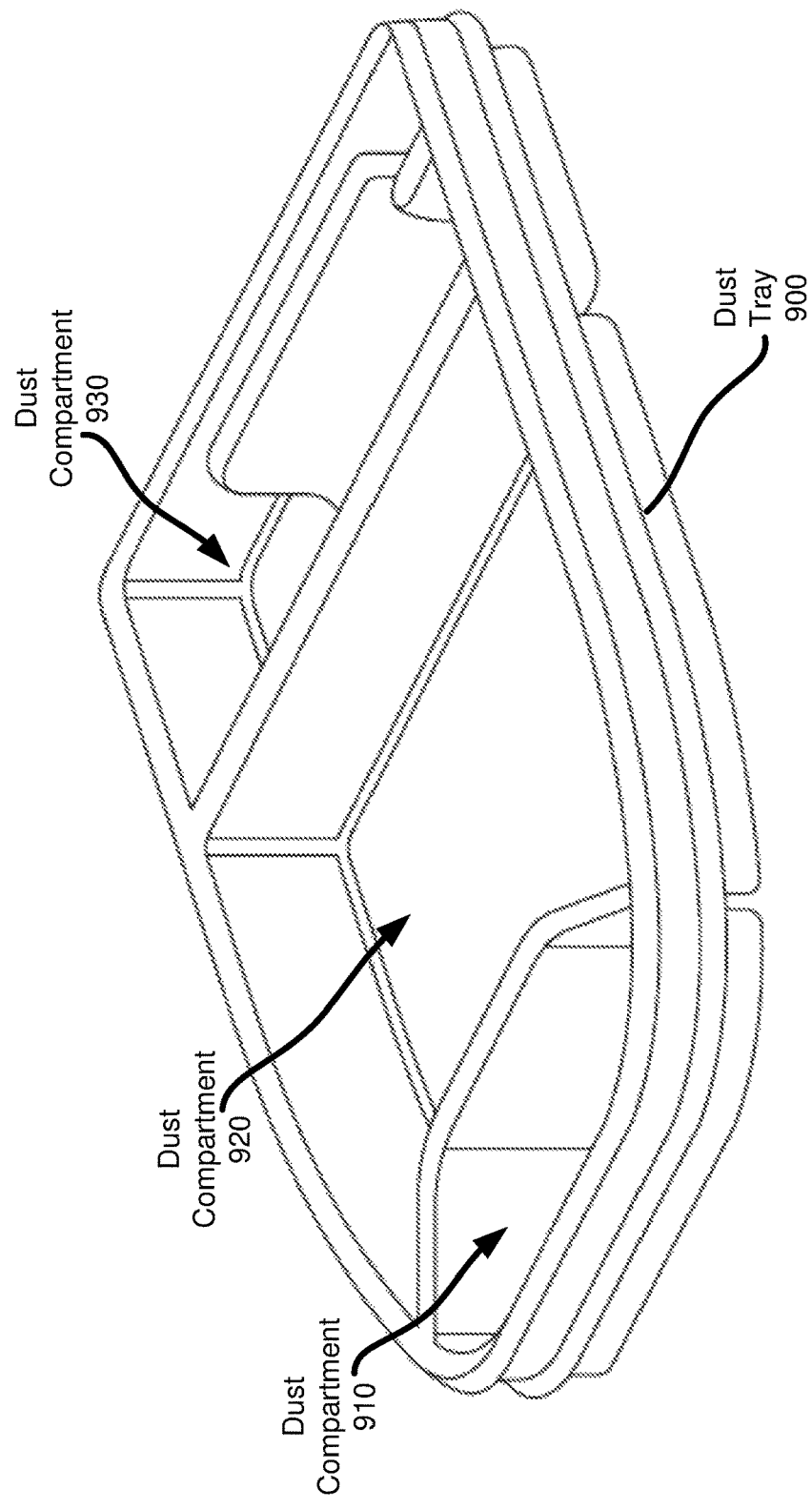
FIG. 23 is a schematic of an exemplary dust tray in accordance with an aspect of the subject specification.
Figure 24:
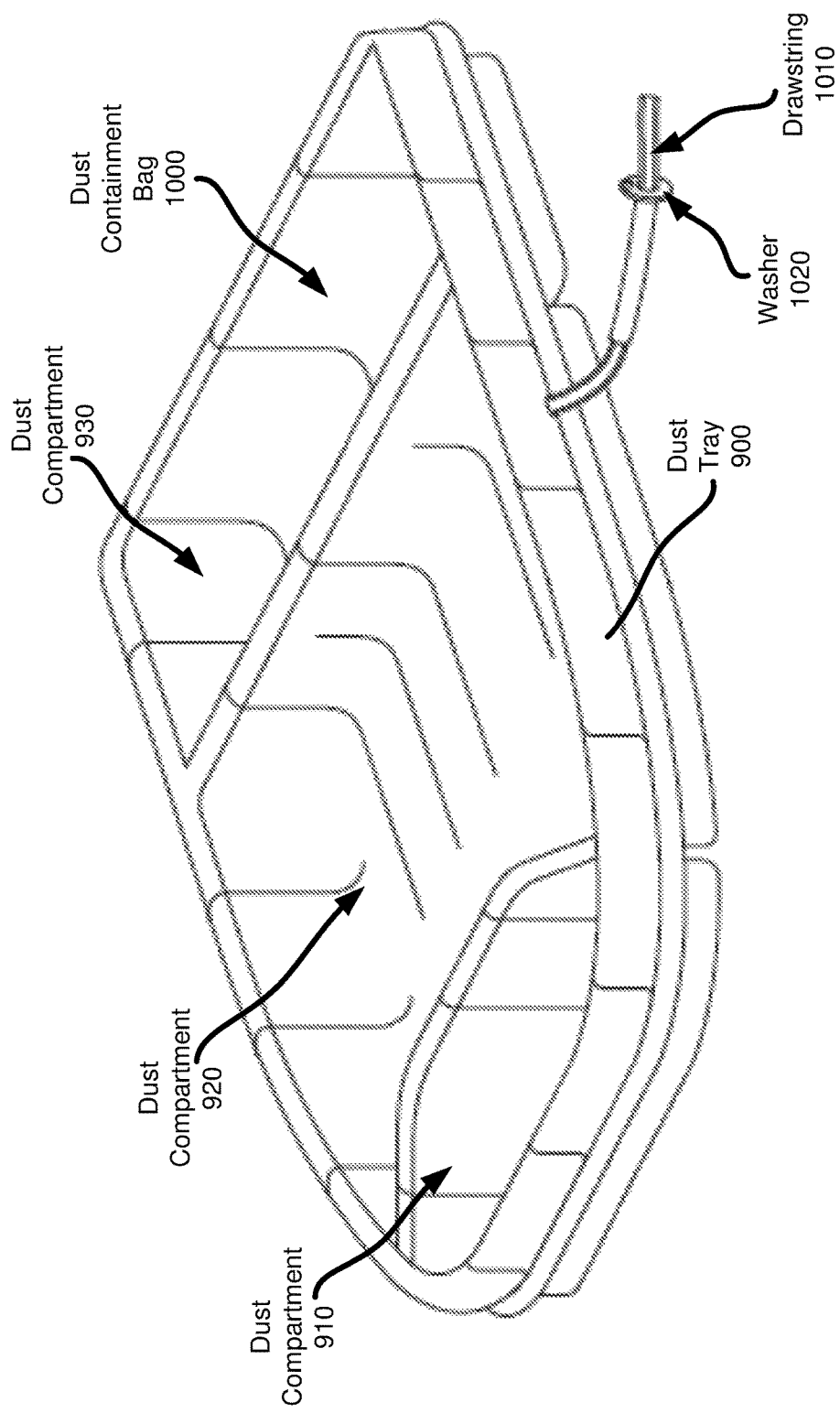
FIG. 24 is a schematic of an exemplary unclosed dust containment bag on a dust tray in accordance with an aspect of the subject specification.
Figure 25:
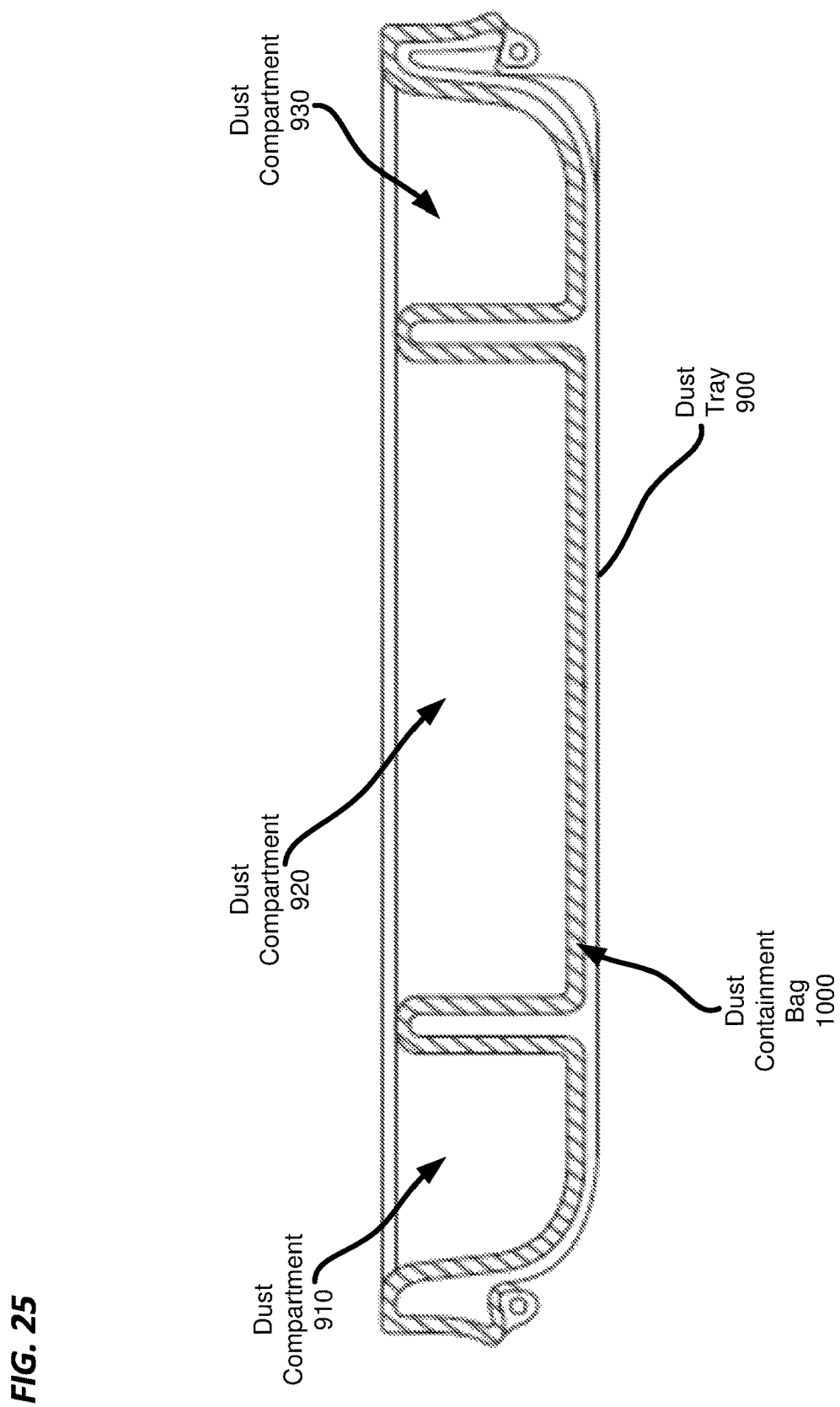
FIG. 25 is a side view of an exemplary unclosed dust containment bag on a dust tray in accordance with an aspect of the subject specification.
Figure 26:
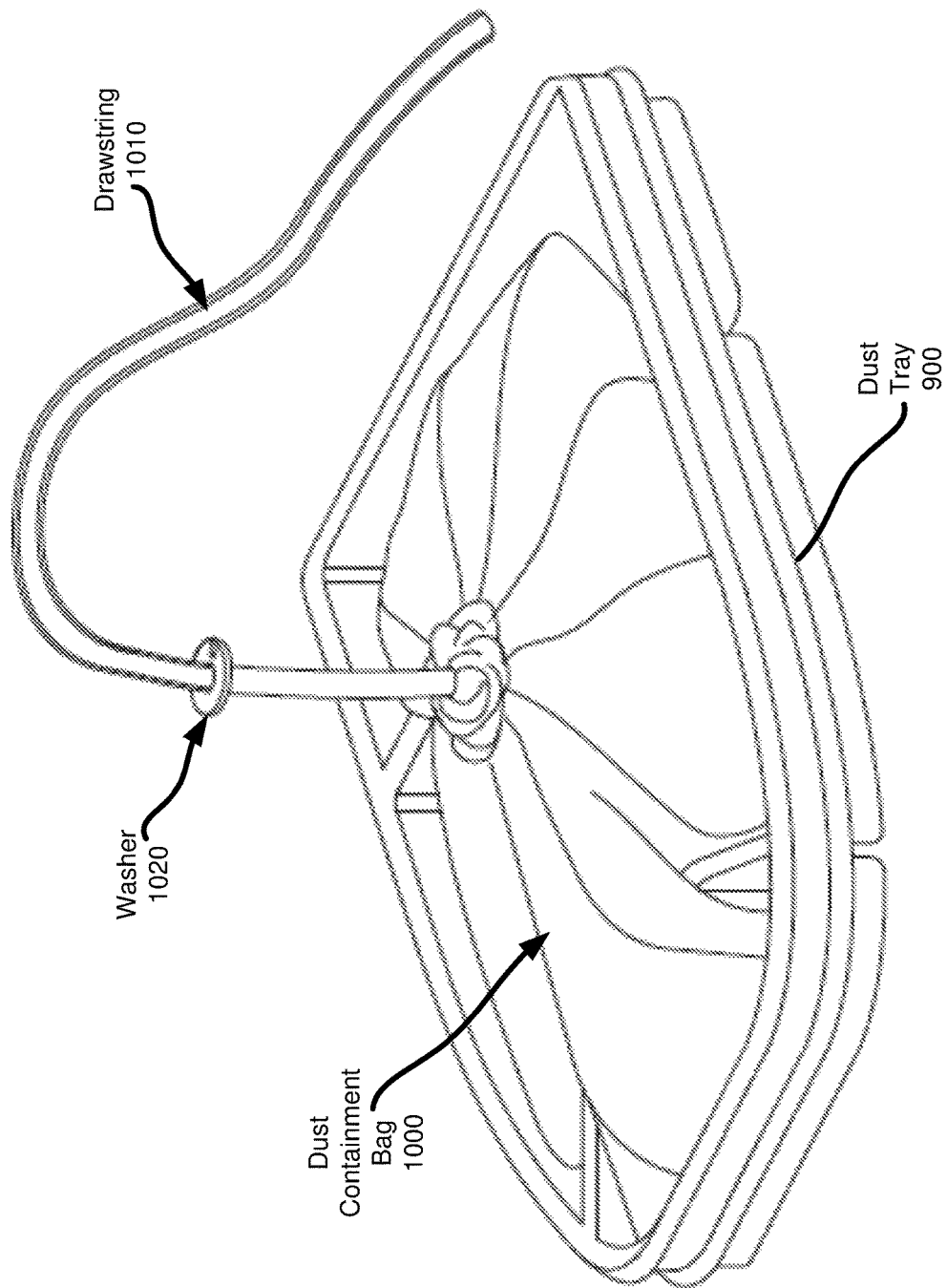
FIG. 26 is a schematic of an exemplary closed dust containment bag on a dust tray in accordance with an aspect of the subject specification.

In a further aspect of the disclosure, it has been discovered that circular saw blades are more likely to overheat when they are not stabilized. Accordingly, various aspects for stabilizing a circular saw blade to minimize wobbling during use are contemplated. In a particular contemplated aspect, blade stabilizing rollers are coupled to a circular saw blade, as shown in FIG. 22. Within such embodiment, circular saw blade 830 is housed within blade guard 832, and coupled to arbor shaft 830 and blade stabilizing rollers 835, as shown.

During use, arbor shaft 830 begins to spin, which causes circular saw blade 830 to rotate. Once circular saw blade 830 makes contact with a workpiece, blade stabilizing rollers 835 firmly keeps circular saw blade 830 aligned while still allowing rotation. Therefore, because circular saw blade 830 is better stabilized and less susceptible to wobbling, circular saw blade 830 is less likely to overheat.

Exemplary Multistage Filter Aspects

As previously mentioned, various aspects directed towards utilizing a multistage filter are contemplated, such as aforementioned apparatus 200. In a particular embodiment, an apparatus is disclosed which includes a housing comprising a vacuum source and a multistage filter. The apparatus further includes a circular saw blade and a worktable comprising a center slot axially aligned to the circular saw blade. Here, the vacuum source is configured to provide a negative pressure beneath the worktable at the center slot, and the multistage filter is configured to collect airborne dust drawn by the negative pressure from an area proximate to the center slot.

Figure 27:
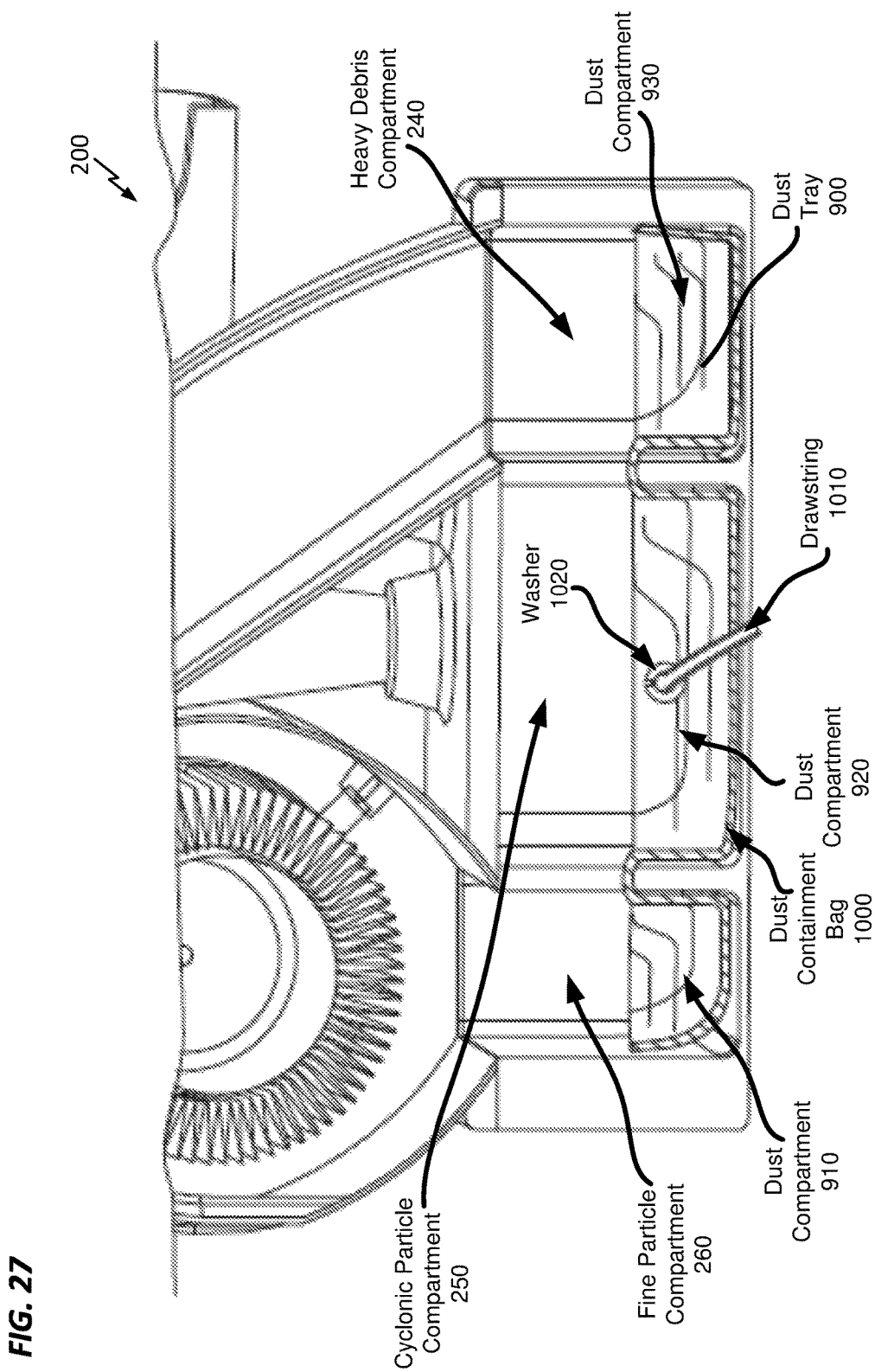
FIG. 27 is a schematic of an exemplary removable dust tray inserted in an apparatus with an unclosed dust containment bag in accordance with an aspect of the subject specification.
Figure 28:
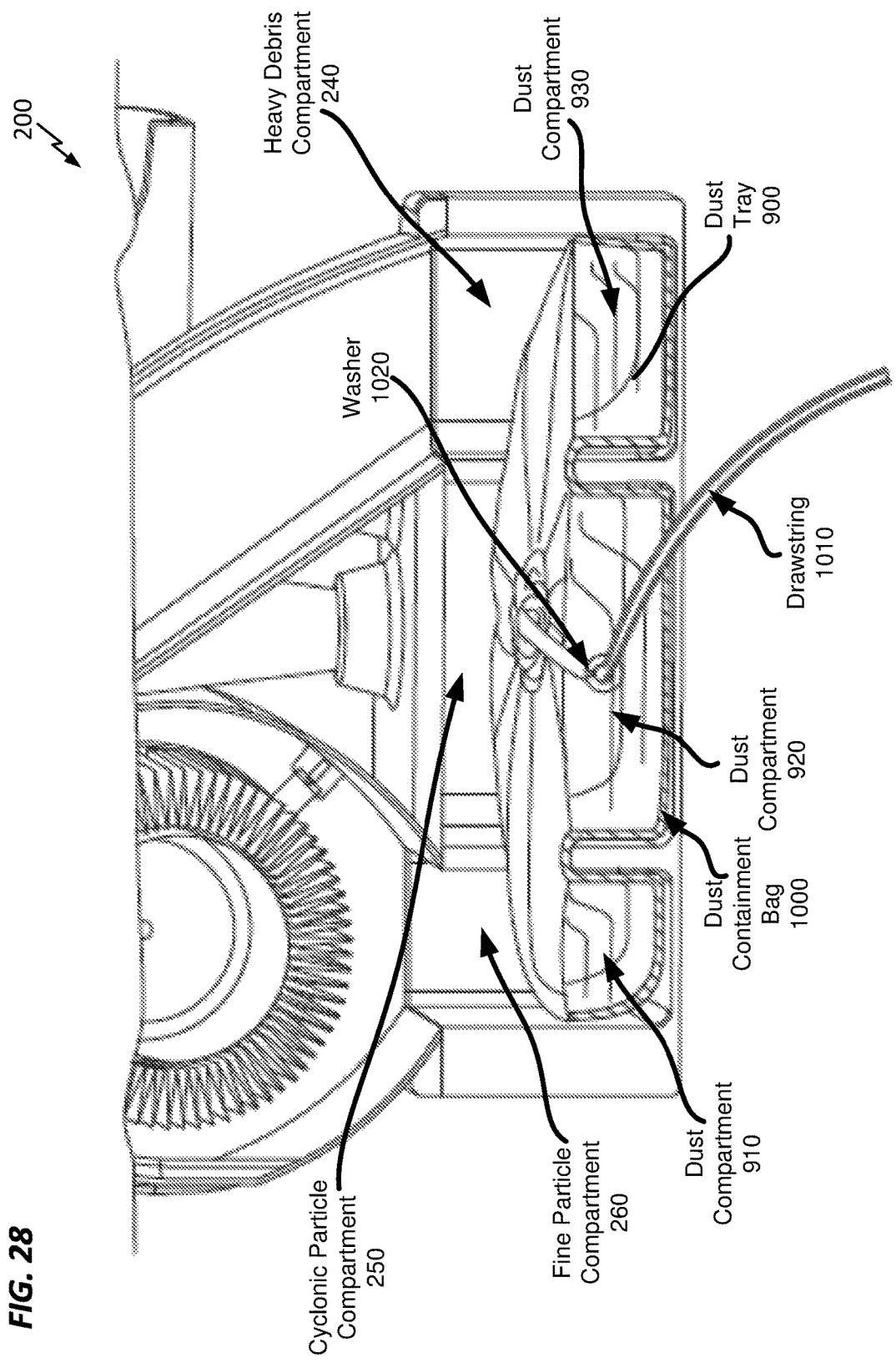
FIG. 28 is a schematic of an exemplary removable dust tray inserted in an apparatus with a closed dust containment bag in accordance with an aspect of the subject specification.
Figure 29:
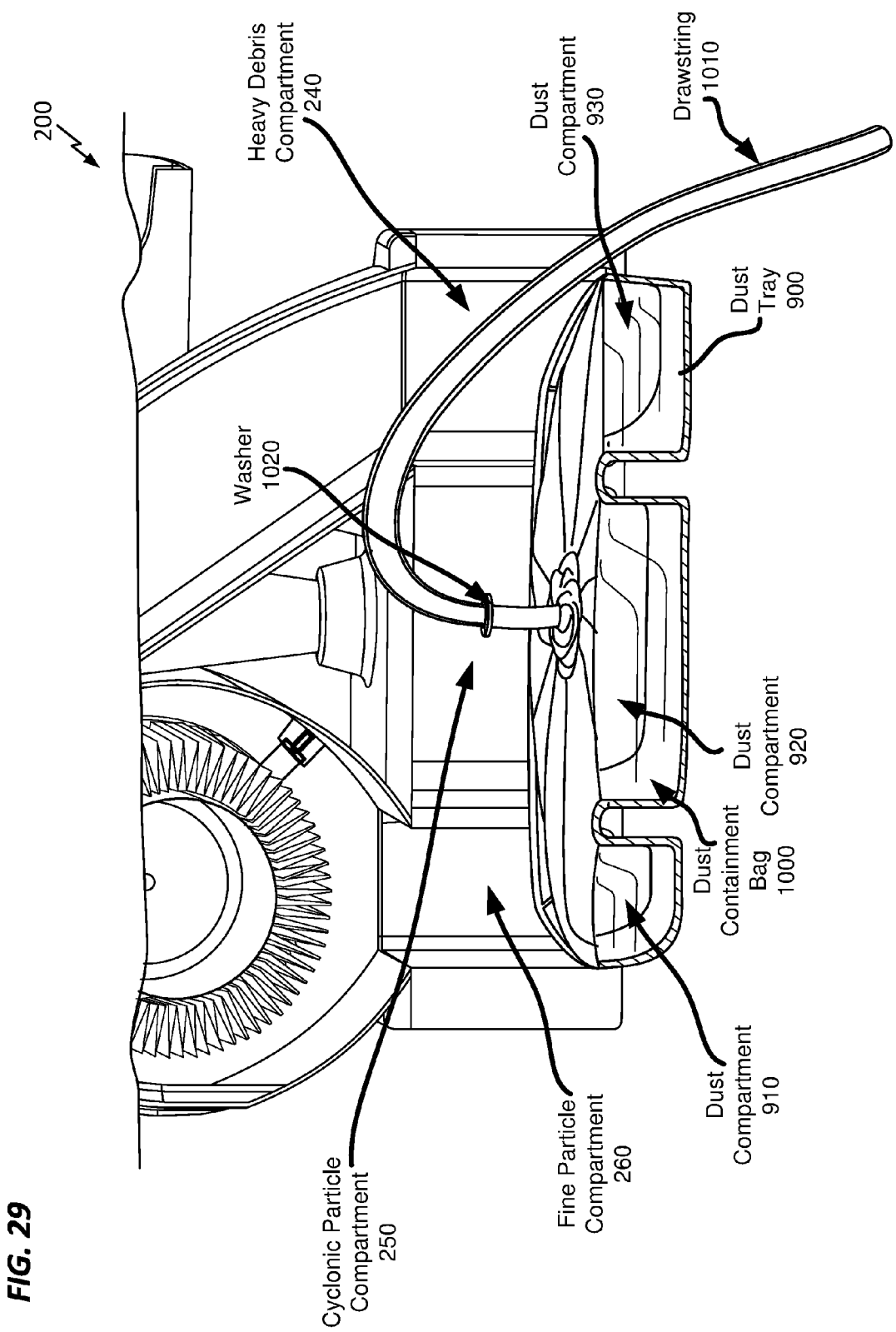
FIG. 29 is a schematic of an exemplary removable dust tray removed from an apparatus in accordance with an aspect of the subject specification.

For some countries, the actual removal of dust from the apparatus disclosed herein is problematic. Accordingly, various aspects for a specialized removable dust tray are contemplated, as illustrated in FIGS. 23-26, and as further illustrated within apparatus 200 in FIGS. 27-29. As shown, a removable dust tray 900 may be placed beneath the multistage filter, wherein the removable dust tray 900 comprises a plurality of separate compartments 910, 920, and 930, and wherein each stage of the multistage filter has a corresponding compartment (e.g., beneath fine particle compartment 260, cyclonic particle compartment 250, and heavy debris compartment 260) within the removable dust tray 900. The removable dust tray 900 can be further configured to accommodate at least one dust containment bag 1000, which comprises a drawstring 1010 and washer 1020, as shown. By pulling on the drawstring 1010 while the removable dust tray 900 is inserted in apparatus 200, a user can seal all collected dust before removing the removable dust tray 900 from the apparatus 200.

Exemplary Auxiliary Port Aspects

As previously mentioned, various aspects directed towards utilizing an auxiliary port are contemplated, such as aforementioned apparatus 200. In a particular embodiment, an apparatus is disclosed, which includes a vacuum source, a circular saw blade, and a worktable. For this embodiment, the worktable comprises a center slot axially aligned to the circular saw blade, and the vacuum source is configured to provide a first negative pressure beneath the worktable at the center slot. The vacuum source is then further configured to provide a second negative pressure via an auxiliary port.

Figure 30:
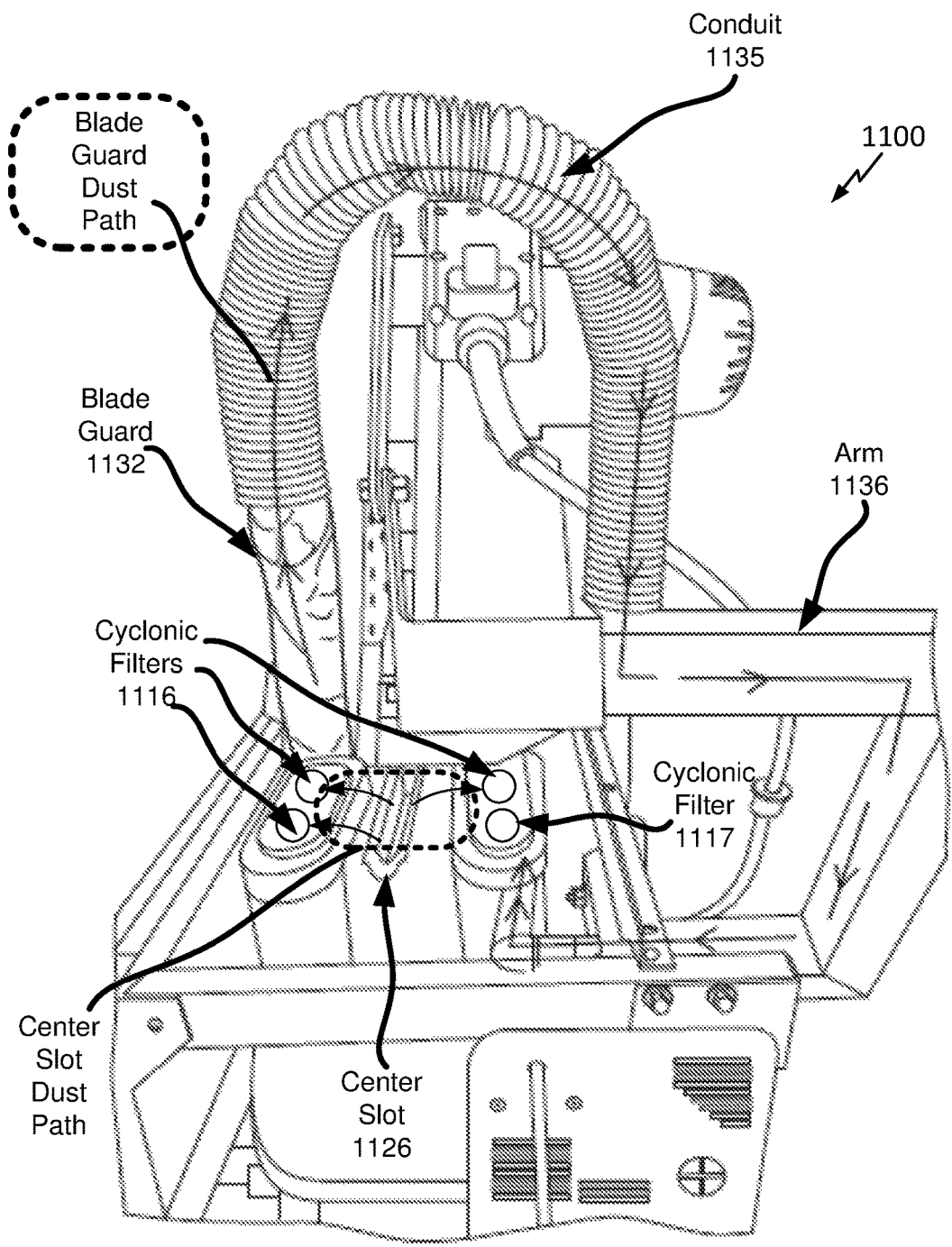
FIG. 30 is a schematic of an exemplary diverted path of blade guard dust in accordance with an aspect of the subject specification.

For some configurations, it may be desirable to divert dust via a different dust path. For instance, FIG. 30 provides a schematic of an exemplary diverted path of blade guard dust in accordance with an aspect of the subject specification. Here, three cyclonic filters 1116 are dedicated to receiving dust collected at center slot 1126, whereas a fourth cyclonic filter 1117 is dedicated to collecting dust from the blade guard 1132 over the top through the support arm 1136. This allows us to have a constant supply of vacuum in this backside of the blade, if needed.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components coupled to other components rather than included within parent components (hierarchical). Additionally, it is noted that one or more components may be combined into a single component providing aggregate functionality or divided into several separate sub-components, and any one or more middle layers may be provided to couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the various figures. While for purposes of simplicity of explanation, the methodologies are described as a series of steps, it is to be understood and appreciated that the disclosed subject matter is not limited by the order of the steps, as some steps may occur in different orders and/or concurrently with other steps from what is described herein. Moreover, not all disclosed steps may be required to implement the methodologies described hereinafter.

While the various embodiments have been described in connection with the exemplary embodiments of the various figures, it is to be understood that other similar embodiments may be used or modifications and additions may be made to the described embodiment for performing the same function without deviating there from. Therefore, the present invention should not be limited to any single embodiment.

The invention claimed is:

1. A saw apparatus comprising:
   a vacuum source;
   a circular saw blade; and
   a worktable comprising a center slot axially aligned to the circular saw blade, wherein the center slot includes an air flow channel proximate to an anticipated point of contact between the circular saw blade and a workpiece, and wherein the vacuum source is configured to provide a focused negative pressure beneath the worktable via an alignment of the air flow channel with the anticipated point of contact, the focused negative pressure being inversely proportional to an aperture size of the air flow channel.

2. The saw apparatus of claim 1, wherein the worktable is configured to slide towards the circular saw blade, and wherein the center slot comprises a plurality of louvers that individually form the air flow channel, the air flow channel sequentially varying according to which of the plurality of louvers is proximate to the anticipated point of contact as the worktable slides towards the circular saw blade.

3. The saw apparatus of claim 2, further comprising a center slot insert comprising a plurality of gaps in phase with the plurality of louvers, wherein the insert transforms the aperture size of the air flow channel into a reduced aperture size, and wherein the reduced aperture size increases a magnitude of the focused negative pressure.

4. The saw apparatus of claim 1, wherein the air flow channel is configured to restrict an escape of the focused negative pressure beyond the anticipated point of contact.

\* \* \* \* \*

UNITED STATES PATENT AND TRADEMARK OFFICE
CERTIFICATE OF CORRECTION

PATENT NO. : 10,239,136 B2
APPLICATION NO. : 15/253865
DATED : March 26, 2019
INVENTOR(S) : Paul W. Guth Page 1 of 1

It is certified that error appears in the above-identified patent and that said Letters Patent is hereby corrected as shown below:

On the Title Page

Related U.S. Application Data should read:
(60) Provisional application no. 62/212,372 filed on Aug. 15, 2015.

Signed and Sealed this
Twenty-eighth Day of July, 2020

Andrei Iancu
*Director of the United States Patent and Trademark Office*